US010687353B2

(12) United States Patent
Hampel et al.

(10) Patent No.: US 10,687,353 B2
(45) Date of Patent: Jun. 16, 2020

(54) MANAGEMENT OF CONFLICTING SCHEDULING COMMANDS IN WIRELESS NETWORKS

(71) Applicant: QUALCOMM Incorporated, San Diego, CA (US)

(72) Inventors: Karl Georg Hampel, Hoboken, NJ (US); Junyi Li, Chester, NJ (US); Navid Abedini, Raritan, NJ (US); Sundar Subramanian, San Diego, CA (US); Juergen Cezanne, Ocean Township, NJ (US); Muhammad Nazmul Islam, Edison, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/008,304

(22) Filed: Jun. 14, 2018

(65) Prior Publication Data
US 2019/0014592 A1 Jan. 10, 2019

Related U.S. Application Data

(60) Provisional application No. 62/530,723, filed on Jul. 10, 2017.

(51) Int. Cl.
*H04W 72/14* (2009.01)
*H04W 56/00* (2009.01)
(Continued)

(52) U.S. Cl.
CPC ......... *H04W 72/14* (2013.01); *H04W 56/001* (2013.01); *H04W 72/1278* (2013.01); *H04B 7/15542* (2013.01); *H04W 72/1257* (2013.01)

(58) Field of Classification Search
CPC ..... H04W 72/02; H04W 72/04; H04W 72/14; H04W 72/1278; H04W 56/00; H04W 56/001; H04B 7/15542
(Continued)

(56) References Cited

U.S. PATENT DOCUMENTS

2009/0290560 A1* 11/2009 Feng ................... H04W 72/082
370/336
2013/0178219 A1* 7/2013 Lee ....................... H04W 72/04
455/450
(Continued)

OTHER PUBLICATIONS

International Search Report and Written Opinion—PCT/US2018/037878—ISA/EPO—dated Oct. 11, 2018.

*Primary Examiner* — Candal Elpenord
(74) *Attorney, Agent, or Firm* — Holland & Hart LLP

(57) ABSTRACT

A wireless node (e.g., a slave relay node) may receive scheduling commands over multiple wireless links and identify a scheduling conflict. For example, the wireless node my identify a conflict of wireless resources indicated by the received scheduling commands. The wireless node may select a non-conflicting subset of the scheduling commands based on a conflict policy, and transmit data over the wireless links according to the non-conflicting subset of the scheduling commands. Additionally or alternatively, the wireless node may transmit a conflict report indicating the identified scheduling conflict. The conflict report may be sent to other wireless nodes (e.g., master relay nodes associated with the conflicting scheduling commands). The other wireless nodes may engage in negotiation signaling to resolve the scheduling conflict, and may transmit an updated scheduling command to the slave relay node. The slave relay node may transmit data over wireless links based on the updated scheduling command.

30 Claims, 14 Drawing Sheets

(51) Int. Cl.
*H04W 72/12* (2009.01)
*H04B 7/155* (2006.01)

(58) Field of Classification Search
USPC .................................................. 370/328–330
See application file for complete search history.

(56) References Cited

U.S. PATENT DOCUMENTS

| | | | |
|---|---|---|---|
| 2014/0016591 A1* | 1/2014 | Kim | H04J 11/005 370/329 |
| 2014/0056278 A1 | 2/2014 | Marinier et al. | |
| 2014/0317241 A1* | 10/2014 | Zhao | H04L 65/608 709/219 |
| 2015/0257027 A1* | 9/2015 | Bodduru | H04L 5/14 370/280 |
| 2016/0007371 A1* | 1/2016 | Pietraski | H04W 72/1263 370/315 |
| 2016/0128097 A1* | 5/2016 | Pajukoski | H04L 5/0055 370/336 |
| 2016/0174280 A1* | 6/2016 | Singh | H04W 76/15 370/329 |
| 2016/0183232 A1* | 6/2016 | Stirling-Gallacher | H04W 72/1226 370/280 |
| 2016/0192379 A1 | 6/2016 | Behravan et al. | |
| 2016/0330645 A1* | 11/2016 | Mishra | H04W 28/0236 |
| 2017/0055175 A1* | 2/2017 | Leroux | H04W 28/0231 |

* cited by examiner

MANAGEMENT OF CONFLICTING SCHEDULING COMMANDS IN WIRELESS NETWORKS

CROSS REFERENCES

The present application for patent claims the benefit of U.S. Provisional Patent Application No. 62/530,723 by Hampel et al., entitled "MANAGEMENT OF CONFLICTING SCHEDULING COMMANDS IN WIRELESS NETWORKS," filed Jul. 10, 2017, assigned to the assignee hereof, and expressly incorporated herein.

BACKGROUND

The following relates generally to wireless communication, and more specifically to management of conflicting scheduling commands in wireless networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may employ a wireline link to communicate with neighboring base stations to coordinate backhaul transmissions. Some wireless communications systems (e.g., millimeter wave (mmW) communications systems) may deploy a large number of densely-spaced base stations. In such systems, the base stations may use wireless backhaul links (e.g., relay nodes) for backhaul communications in addition to or instead of wireline links. However, such a dense deployment of base stations may be affected by uncoordinated scheduling and inefficient (e.g., overlapping) resource allocation.

SUMMARY

The described techniques relate to improved methods, systems, devices, or apparatuses that support management of conflicting scheduling commands in wireless networks. A wireless node (e.g., a slave relay node) may receive scheduling commands over multiple wireless links and identify a scheduling conflict. For example, the wireless node may identify a conflict of wireless resources indicated by the received scheduling commands. The wireless node may select a non-conflicting subset of the scheduling commands based on a conflict policy, and transmit data over the wireless links according to the non-conflicting subset of the scheduling commands. The conflict policy may be based on a size of the non-conflicting subset, priority information indicated by the scheduling commands, route priority of the wireless links, etc.

Additionally or alternatively, the wireless node may transmit a conflict report indicating the identified scheduling conflict. The conflict report may be sent to other wireless nodes (e.g., master relay nodes associated with the conflicting scheduling commands) based on a selection policy. The other wireless nodes may engage in negotiation signaling to resolve the scheduling conflict, and may transmit an updated scheduling command to the slave relay node. The slave relay node may then transmit data over wireless links according to the updated scheduling command. Such techniques may be applicable to conflicting scheduling commands associated with relay nodes communicating over wireless backhaul links, fronthaul links, wireless access links, etc.

A method of wireless communication is described. The method may include receiving a plurality of scheduling commands over a plurality of wireless links, identifying a conflict for a wireless resource associated with the plurality of scheduling commands, selecting a non-conflicting subset of the plurality of scheduling commands based at least in part on a conflict policy, and transmitting data over one or more of the plurality of wireless links based at least in part on the selected non-conflicting subset.

An apparatus for wireless communication is described. The apparatus may include means for receiving a plurality of scheduling commands over a plurality of wireless links, means for identifying a conflict for a wireless resource associated with the plurality of scheduling commands, means for selecting a non-conflicting subset of the plurality of scheduling commands based at least in part on a conflict policy, and means for transmitting data over one or more of the plurality of wireless links based at least in part on the selected non-conflicting subset.

Another apparatus for wireless communication is described. The apparatus may include a processor, memory in electronic communication with the processor, and instructions stored in the memory. The instructions may be operable to cause the processor to receive a plurality of scheduling commands over a plurality of wireless links, identify a conflict for a wireless resource associated with the plurality of scheduling commands, select a non-conflicting subset of the plurality of scheduling commands based at least in part on a conflict policy, and transmit data over one or more of the plurality of wireless links based at least in part on the selected non-conflicting subset.

A non-transitory computer readable medium for wireless communication is described. The non-transitory computer-readable medium may include instructions operable to cause a processor to receive a plurality of scheduling commands over a plurality of wireless links, identify a conflict for a wireless resource associated with the plurality of scheduling commands, select a non-conflicting subset of the plurality of scheduling commands based at least in part on a conflict policy, and transmit data over one or more of the plurality of wireless links based at least in part on the selected non-conflicting subset.

Some examples of the method, apparatus, and non-transitory computer-readable medium described above may further include processes, features, means, or instructions for receiving signaling indicating the conflict policy. In some examples of the method, apparatus, and non-transitory computer-readable medium described above, the conflict policy may be based at least in part on priority information signaled in one or more of the plurality of scheduling commands. In some examples of the method, apparatus, and non-transitory computer-readable medium described above, the conflict policy may be based at least in part on a size of the selected non-conflicting subset.

In some examples of the method, apparatus, and non-transitory computer-readable medium described above, the size of the selected non-conflicting subset may be larger than other non-conflicting subsets of the plurality of scheduling commands. In some examples of the method, apparatus, and non-transitory computer-readable medium described above, the conflict policy may be based at least in part on a priority level associated with one or more of the plurality of wireless links.

In some examples of the method, apparatus, and non-transitory computer-readable medium described above, the conflict policy may be based at least in part on a scheduling command type associated with the plurality of scheduling commands. In some examples of the method, apparatus, and non-transitory computer-readable medium described above, the scheduling command type comprises a scheduling request or a scheduling grant.

In some examples of the method, apparatus, and non-transitory computer-readable medium described above, the conflict policy may be based at least in part on a non-prioritized scheduling algorithm. In some examples of the method, apparatus, and non-transitory computer-readable medium described above, the non-prioritized scheduling algorithm comprises a round-robin algorithm.

In some examples of the method, apparatus, and non-transitory computer-readable medium described above, the conflict policy may be based at least in part on a route priority associated with a subset of the plurality of wireless links. In some examples of the method, apparatus, and non-transitory computer-readable medium described above, the conflict policy may be based at least in part on a buffer size associated with one or more of the plurality of wireless links. In some examples of the method, apparatus, and non-transitory computer-readable medium described above, the conflict policy may be based at least in part on a degree of isolation between one or more antenna ports associated with the plurality of scheduling commands.

In some examples of the method, apparatus, and non-transitory computer-readable medium described above, the wireless resource comprises a time resource, a frequency resource, a code resource, a spatial resource, or a combination thereof. In some examples of the method, apparatus, and non-transitory computer-readable medium described above, the wireless links comprise millimeter wave (mmW) wireless backhaul links. In some examples of the method, apparatus, and non-transitory computer-readable medium described above, the plurality of scheduling commands comprises a scheduling request, a scheduling grant, or both.

In some examples of the method, apparatus, and non-transitory computer-readable medium described above, the plurality of scheduling commands may be received over a physical control channel, a media (or medium) access control (MAC) channel, an upper layer channel, or a combination thereof.

In some examples of the method, apparatus, and non-transitory computer-readable medium described above, the plurality of scheduling commands may be received according to a time-synchronized frame structure. In some examples of the method, apparatus, and non-transitory computer-readable medium described above, the plurality of scheduling commands may be received according to beam-formed antenna pattern.

Some examples of the method, apparatus, and non-transitory computer-readable medium described above may further include processes, features, means, or instructions for receiving the plurality of scheduling commands within a first time window. Some examples of the method, apparatus, and non-transitory computer-readable medium described above may further include processes, features, means, or instructions for transmitting a second plurality of scheduling commands within a second time window that may be non-overlapping with the first time window.

In some examples of the method, apparatus, and non-transitory computer-readable medium described above, the plurality of wireless links comprises wireless backhaul links, fronthaul links, access links, or some combination thereof.

A method of wireless communication is described. The method may include receiving a plurality of scheduling commands over a plurality of wireless links, identifying a conflict for a wireless resource associated with the plurality of scheduling commands, transmitting a conflict report indicating the identified conflict, receiving an updated scheduling command based at least in part on the plurality of scheduling commands and the conflict report, and transmitting data over one or more of the plurality of wireless links based at least in part on the updated scheduling command.

An apparatus for wireless communication is described. The apparatus may include means for receiving a plurality of scheduling commands over a plurality of wireless links, means for identifying a conflict for a wireless resource associated with the plurality of scheduling commands, means for transmitting a conflict report indicating the identified conflict, means for receiving an updated scheduling command based at least in part on the plurality of scheduling commands and the conflict report, and means for transmitting data over one or more of the plurality of wireless links based at least in part on the updated scheduling command.

Another apparatus for wireless communication is described. The apparatus may include a processor, memory in electronic communication with the processor, and instructions stored in the memory. The instructions may be operable to cause the processor to receive a plurality of scheduling commands over a plurality of wireless links, identify a conflict for a wireless resource associated with the plurality of scheduling commands, transmit a conflict report indicating the identified conflict, receive an updated scheduling command based at least in part on the plurality of scheduling commands and the conflict report, and transmit data over one or more of the plurality of wireless links based at least in part on the updated scheduling command.

A non-transitory computer readable medium for wireless communication is described. The non-transitory computer-readable medium may include instructions operable to cause a processor to receive a plurality of scheduling commands over a plurality of wireless links, identify a conflict for a wireless resource associated with the plurality of scheduling commands, transmit a conflict report indicating the identified conflict, receive an updated scheduling command based at least in part on the plurality of scheduling commands and the conflict report, and transmit data over one or more of the plurality of wireless links based at least in part on the updated scheduling command.

Some examples of the method, apparatus, and non-transitory computer-readable medium described above may further include processes, features, means, or instructions for selecting a node, based at least in part on a selection policy, to which the conflict report may be transmitted.

In some examples of the method, apparatus, and non-transitory computer-readable medium described above, the selection policy may be based at least in part on a priority associated with a wireless link associated with the node, a type of scheduling command received from the node, a priority associated with a scheduling command received from the node, a configured subset of nodes that includes the node, or a combination thereof.

Some examples of the method, apparatus, and non-transitory computer-readable medium described above may further include processes, features, means, or instructions for receiving signaling indicating the selection policy. In some examples of the method, apparatus, and non-transitory computer-readable medium described above, the conflict report comprises information indicating one or more nodes that transmitted the plurality of scheduling commands, information indicating the wireless resources associated with the identified conflict, information indicating a direction of data transmission, or a combination thereof.

In some examples of the method, apparatus, and non-transitory computer-readable medium described above, the plurality of wireless links comprises wireless backhaul links, fronthaul links, access links, or some combination thereof.

A method of wireless communication is described. The method may include transmitting a scheduling command over a wireless link, receiving a conflict report indicating a conflict for a wireless resource associated with the transmitted scheduling command and at least one additional scheduling command, transmitting an updated scheduling command based at least in part on the transmitted scheduling command and the conflict report, and receiving data over the wireless link based at least in part on the updated scheduling command.

An apparatus for wireless communication is described. The apparatus may include means for transmitting a scheduling command over a wireless link, means for receiving a conflict report indicating a conflict for a wireless resource associated with the transmitted scheduling command and at least one additional scheduling command, means for transmitting an updated scheduling command based at least in part on the transmitted scheduling command and the conflict report, and means for receiving data over the wireless link based at least in part on the updated scheduling command.

Another apparatus for wireless communication is described. The apparatus may include a processor, memory in electronic communication with the processor, and instructions stored in the memory. The instructions may be operable to cause the processor to transmit a scheduling command over a wireless link, receive a conflict report indicating a conflict for a wireless resource associated with the transmitted scheduling command and at least one additional scheduling command, transmit an updated scheduling command based at least in part on the transmitted scheduling command and the conflict report, and receive data over the wireless link based at least in part on the updated scheduling command.

A non-transitory computer readable medium for wireless communication is described. The non-transitory computer-readable medium may include instructions operable to cause a processor to transmit a scheduling command over a wireless link, receive a conflict report indicating a conflict for a wireless resource associated with the transmitted scheduling command and at least one additional scheduling command, transmit an updated scheduling command based at least in part on the transmitted scheduling command and the conflict report, and receive data over the wireless link based at least in part on the updated scheduling command.

Some examples of the method, apparatus, and non-transitory computer-readable medium described above may further include processes, features, means, or instructions for transmitting negotiation signaling to a node associated with the at least one additional scheduling command. Some examples of the method, apparatus, and non-transitory computer-readable medium described above may further include processes, features, means, or instructions for transmitting the scheduling command based at least in part on a timing delay between transmission of the scheduling command and data associated with the scheduling command.

In some examples of the method, apparatus, and non-transitory computer-readable medium described above, the wireless link comprises a wireless backhaul link, a fronthaul link, or an access link.

DETAILED DESCRIPTION

Figure 1:
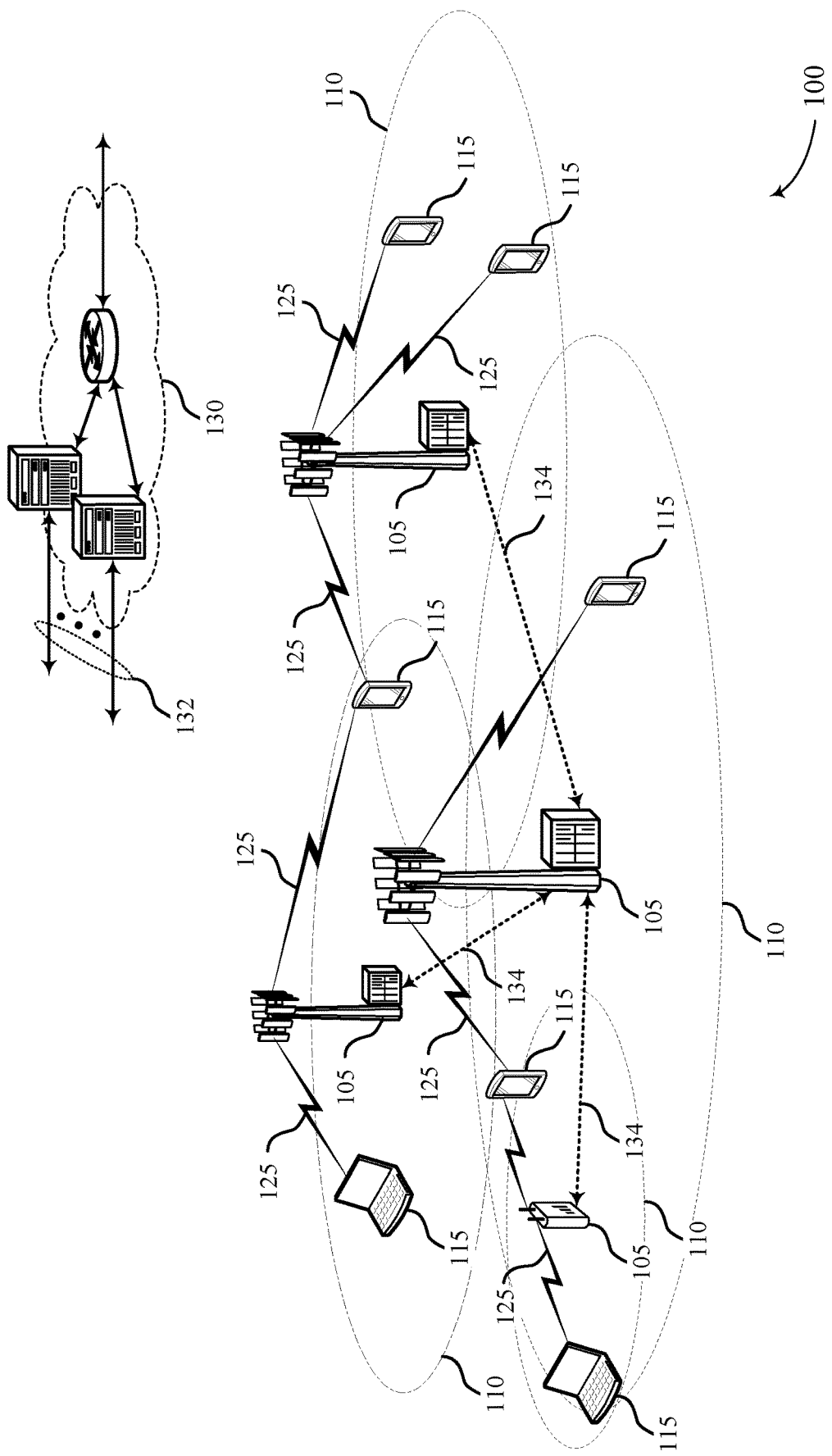
FIG. 1 illustrates an example of a system for wireless communication that supports management of conflicting scheduling commands in wireless networks in accordance with aspects of the present disclosure.

Wireless communications systems utilize backhaul links as a connection between a core network and access nodes (e.g., base stations) within the wireless communications network. However, due to the widespread deployment of base stations within a given region, installing wireline backhaul links to each base station within a network may be cost prohibitive. Therefore, cellular radio access technologies (RATs) may be used to provide backhaul links between multiple base stations and a core network. In such cases, base stations (e.g., relay nodes) may wirelessly communicate backhaul access traffic to a high-capacity fiber point (e.g., a location where a wireless node or base station is coupled with a wireline link to a network). Backhaul techniques that use cellular RATs to coordinate signaling and resource allocation for a wireless backhaul network may provide a more beneficial method of backhaul communication for a dense population of millimeter wave (mmW) base stations (e.g., provide a lower cost and a more feasible option to installing fiber optic communication lines to each mmW base station). However, uncoordinated scheduling (e.g., from two or more relay nodes) may result in scheduling conflicts (e.g., inefficient or overlapping resource allocation).

Accordingly, wireless communications systems may support techniques for management of conflicting scheduling commands in accordance with aspects of the present disclosure. A wireless node (e.g., a base station, relay node, etc.) may receive multiple scheduling commands and may identify a scheduling conflict based on the received scheduling commands. For example, the wireless node may act or serve as a slave node to two or more other relay nodes (e.g., master nodes). The scheduling commands received from the two or more other relay nodes may be associated with a conflict for use of a wireless resource (e.g., a time resource, a frequency resource, a code resource, a spatial resource, etc.). Therefore, upon evaluating the scheduling commands and identifying a scheduling conflict, the wireless node may identify a subset of scheduling commands not associated with conflicting resources, and execute the subset of non-conflicting scheduling commands. That is, the wireless node may transmit data over wireless links using resources based on the non-conflicting subset of scheduling commands. For example, if there is a conflict only for a subset of resources (e.g., time slots), the wireless node may execute the scheduling commands for the remaining resources not associated with the conflict.

Additionally or alternatively, techniques for management of conflicting scheduling commands may include conflict reporting in attempt to resolve the scheduling conflict. A wireless node (e.g., a slave node) may identify a scheduling conflict based on received scheduling commands, and may reduce or resolve the conflict via conflict reporting to the relay nodes (e.g., master nodes) associated with the scheduling commands resulting in conflict. The wireless node (e.g., the slave node) may select master nodes for conflict reporting based on a selection policy (e.g., various selection criteria). Accordingly, master nodes (e.g., relay nodes, base stations, etc.) may receive the conflict report, resolve the scheduling conflict, and transmit an updated scheduling command to the wireless node (e.g., the slave node associated with the scheduling conflict). In some cases, the master node may resolve the scheduling conflict independently. In other cases, the master node may engage in scheduling conflict negotiation with other master nodes (e.g., negotiate scheduling with master nodes associated with conflicting scheduling commands). Ultimately, the slave node associated with the scheduling conflict may receive the updated scheduling command, and transmit data over one or more wireless links based on the updated scheduling command.

Aspects of the disclosure are initially described in the context of a wireless communications system. Further examples are then provided that illustrate backhaul networks and process flows implementing scheduling techniques described here. Aspects of the disclosure are further illustrated by and described with reference to apparatus diagrams, system diagrams, and flowcharts that relate to management of conflicting scheduling commands in wireless networks.

FIG. 1 illustrates an example of a wireless communications system 100 in accordance with various aspects of the present disclosure. The wireless communications system 100 includes access nodes 105 (e.g., base stations 105, remote radio heads 105, etc.), UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support one or more node functions that enable management of conflicting scheduling commands in wireless networks.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may wirelessly communicate with UEs 115 via one or more access node antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of an access node controller (not shown). In some examples, base stations 105 may be macro cells, small cells, hot spots, or the like. Base stations 105 may also be referred to as eNodeBs (eNBs) 105.

Wireless communications system 100 may operate in mmW frequency ranges (e.g., 28 GHz, 40 GHz, 60 GHz, etc.). Wireless communication at these frequencies may be associated with increased signal attenuation (e.g., path loss, which may also be influenced by various factors, such as temperature, barometric pressure, diffraction, etc.). As a result, signal processing techniques, such as beamforming, may be used to coherently combine energy and overcome path losses at these frequencies. Further, wireless communication links achieved through beamforming may be associated with narrow beams (e.g., "pencil beams") that are highly directional, minimize inter-link interference, and provide high-bandwidth links between base stations. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

Wireless communications networks may employ backhaul links (e.g., backhaul links 132 or backhaul links 134) as a connection between a core network and wireless nodes within the wireless communications network. For example, wireless communications system 100 may include multiple base stations 105 (e.g., base stations, remote radio heads, etc.), where at least one base station 105 is coupled to a wireline backhaul link, such as an optical fiber cable. However, due to the widespread deployment of base stations 105 within a given region, installing wireline backhaul links to each base station 105 within a network may be cost prohibitive. Therefore, some of the base stations 105 within wireless communications system 100 may not be directly coupled to the core network 130 or to another base station 105, and may use other means, such as wireless backhaul links, to communicate backhaul traffic. For instance, cellular RATs may be used to provide backhaul links between multiple base stations 105 and a core network 130. In such cases, the base stations 105 may wirelessly communicate backhaul access traffic to a high-capacity fiber point (e.g., a location where a wireless node is coupled with a wireline link to core network 130).

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

In some cases, cellular RATs, such as mmW-based RATs, may be used to support access traffic between UEs 115 and base stations 105, in addition to backhaul access traffic among multiple base stations 105. Moreover, both access and backhaul traffic may share the same resources (e.g., as in the case of integrated access and backhaul (TAB)). Such wireless backhaul or TAB solutions may be increasingly beneficial with the evolution of cellular technologies due to enhancements in wireless link capacity and reduction in latency. Further, the use of wireless backhaul links may reduce the cost of dense small cell deployments.

In some cases, an access link using a mmW-based radio access technology (RAT) may be designed as an asymmetric single-hop link, which may be used for assigning control and scheduling tasks to a base station 105 while providing instruction to one or more UEs 115 for scheduling communication. In such cases, a base station 105 may coordinate wireless resources among multiple UEs 115, while each UE 115 may be assigned to only one base station 105 at a time. In some cases, inter-access node links may be symmetric in nature and may form mesh topologies for enhanced robustness, where wireless transport may occur along multiple hops.

Thus, using a RAT may enable wireless backhaul communication using one or more node functions at a wireless node, such as a base station or access node. Additionally, multiple wireless nodes may communicate in a backhaul network using a schedule that is aligned with a frame structure. For example, a wireless node may establish a link with different wireless nodes using a RAT that supports a synchronized frame structure, such as a mmW RAT. The wireless nodes may instantiate one or more node functions, such as an access node function (ANF) and a UE function (UEF). The wireless nodes may then communicate according to active and suspended modes using the node functions, where the communication is based on a schedule aligned with the frame structure.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200 T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
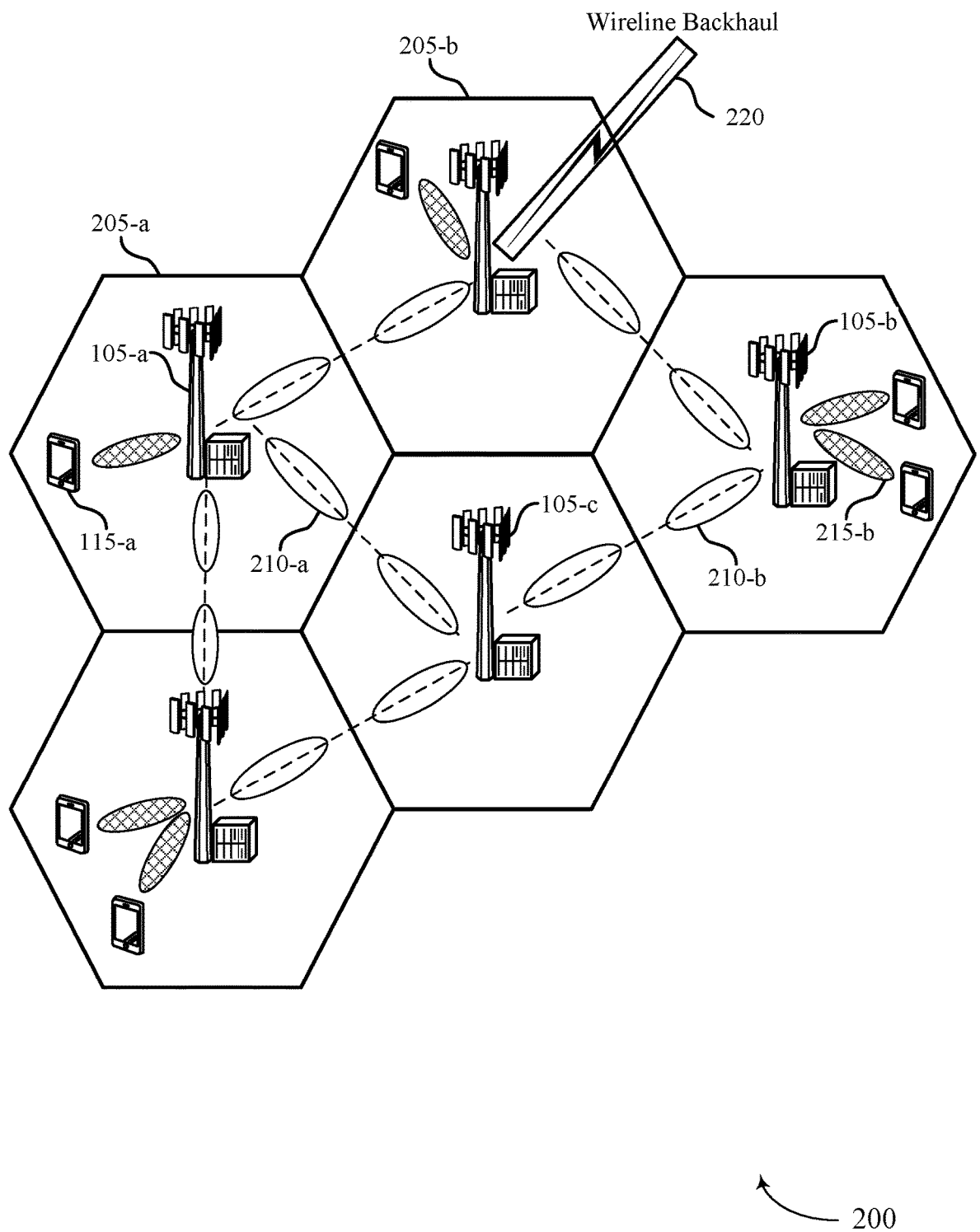
FIG. 2 illustrates an example of a backhaul network that supports management of conflicting scheduling commands in wireless networks in accordance with aspects of the present disclosure.

FIG. 2 illustrates an example of a backhaul network 200 that supports management of conflicting scheduling commands in wireless networks in accordance with various aspects of the present disclosure. In some examples, backhaul network 200 may implement aspects of wireless communications system 100. Backhaul network 200 may include a number of mesh networks 205 that may communicate with each other over wireless links 210 via base stations 105. That is, backhaul network 200 may include wireline backhaul link 220, in addition to several relay nodes (e.g., base stations 105) such that mesh networks 205 may be connected via wireless links 210. Wireless links 210 (e.g., wireless backhaul links, fronthaul links, access links, etc.) may be associated with a same or different set of wireless resources (e.g., time resources, frequency resources, code resources, spatial resources, etc.). Base stations 105 may further communicate with UEs 115 via direct wireless links 215. Backhaul network 200 may support the use of one or more node functions to enable management of conflicting scheduling commands.

In the present example, base station 105-c may act or serve as a slave node associated with wireless link 210-a and wireless link 210-b. Accordingly, base station 105-a may act as a master node associated with wireless link 210-a, and base station 105-b may act as a master node associated with wireless link 210-b. Backhaul network 200 may support techniques for management of conflicting scheduling commands in accordance with aspects of the present disclosure. Base stations 105 (e.g., slave nodes or base station 105-c) may receive multiple scheduling commands and may identify a scheduling conflict based on the received scheduling commands. For example, base station 105-c may receive scheduling commands from base station 105-a and base station 105-b that are associated with a conflict for use of a wireless resource (e.g., a time resource, a frequency resource, a code resource, a spatial resource, etc.). Therefore, upon evaluating the scheduling commands and identifying a scheduling conflict, the base station 105-c may identify a subset of scheduling commands not associated with conflicting resources, and execute the subset of non-conflicting scheduling commands. That is, base station 105-c may transmit data over wireless links using resources based on the non-conflicting subset of scheduling commands. For example, if there is a conflict only for a subset of resources (e.g., time slots), the base station 105-c may execute the scheduling commands for the remaining resources not associated with the conflict.

Additionally or alternatively, techniques for management of conflicting scheduling commands may include conflict reporting in attempt to resolve the scheduling conflict. Base station 105-c may identify a scheduling conflict based on received scheduling commands, and may reduce or resolve the conflict via conflict reporting to the relay nodes (e.g., master nodes) associated with the scheduling commands resulting in conflict (e.g., base station 105-a and base station 105-b). The base station 105-c may select master nodes for conflict reporting based on a selection policy, as further described below. Accordingly, master nodes (e.g., relay nodes, base stations, etc.) may receive the conflict report, resolve the scheduling conflict, and transmit an updated scheduling command to the wireless node (e.g., the slave node associated with the scheduling conflict). In some cases, the master node may resolve the scheduling conflict independently. In other cases, the master node may engage in scheduling conflict negotiation with other master nodes (e.g., base station 105-a and base station 105-b may negotiate scheduling relating to the conflicting scheduling commands). Ultimately, the base station 105-c may receive the updated scheduling command, and transmit data over one or more wireless links (e.g., wireless link 210-a and/or wireless link 210-b) based on the updated scheduling command.

Wireless mesh networks (e.g., backhaul network 200) may support backhaul wireless access traffic in a mobile access network (e.g., such as a cellular access network, which may provide access to UEs 115). Such wireless mesh networks may include relay nodes (e.g., base stations 105), where each base station 105 may provide access to UEs 115 (e.g., via direct wireless links 215) while also supporting one or multiple wireless links 210 with neighboring relay nodes (e.g., other base stations 105).

In some cases, backhaul network 200 may include asymmetric wireless access links using cellular RATs. For example, a wireless link 210 endpoint (e.g., a base station 105) may take on the role of a master node or a slave node, such that downlink traffic may flow from a master node to a slave node and uplink traffic may flow from a slave node to a master node. Master nodes (e.g., master base stations 105) may control downlink and uplink data flows by means of scheduling commands, while slave nodes (e.g., slave base stations 105) may follow such scheduling commands. Scheduling requests may assign resources to downlink traffic and scheduling grants may assign resources to uplink traffic.

In some cellular RATs, UEs 115 may serve as the slave node role and base stations 105 may serve as the master node role. However, in some cases (e.g., where relay nodes provide access to UEs 115), the relay nodes may serve as the master node role for UEs 115. When using such cellular RATs for wireless links 210 (e.g., backhaul links) one end point of the wireless link 210 (e.g., a relay node or a base station 105) may hold the master role while another end point (e.g., base station 105) may serve as a slave node. Such role assignment of a base station 105 (e.g., as a slave or master node) may be permanently assigned to a wireless link 210, or the assignment may be dynamic and roles may be switched over time. Applying such master and slave roles to wireless links 210 (e.g., backhaul links) may allow for the advantage of reusing common RATs for backhaul purposes.

Scheduling commands may allow for distribution of wireless resources across multiple wireless links 210 and direct wireless links 215 and, at the same time, may address the half-duplexing constraint (e.g., the constraint relating to the inability of a wireless link 210 to transfer data in both directions using the same wireless resources or inadequately separated wireless resources). In some cases, frequency resources and/or time resources may be inadequately separated if they do not have sufficient guard band or guard time, respectively, between them. Further, spatial resources (e.g., realized via different antenna configurations) may be inadequately separated if the corresponding antenna configurations do not have sufficient isolation between them. To address this half-duplexing constraint, the scheduling command may contain a scheduling request or a scheduling grant. The scheduling request may assign resources for downlink traffic (e.g., master node to slave node), while the scheduling grant may assign resources for uplink traffic (e.g., salve node to master node).

In some cases, a relay node may have a slave node role on multiple wireless links 210. For example, base station 105-c may serve as a slave node on wireless link 210-a (e.g., with the other endpoint, base station 105-a, serving as the master node for the wireless link) in addition to serving as a slave node on wireless link 210-b (e.g., with the other endpoint, base station 105-b, serving as the master node for the wireless link). In such cases, base station 105-c may receive conflicting scheduling commands from the multiple master nodes (e.g., base station 105-a and base station 105-b). The scheduling commands may, for example, result in scheduling conflict when they request the slave node (e.g., base station 105-c) to simultaneously exchange traffic with multiple masters (e.g., base station 105-a and base station 105-b) using the same resources. The resources may refer to time, frequency, code, or spatial resources. The scheduling commands may further result in scheduling conflict when they request the slave node (e.g., base station 105-c) simultaneously receive and transmit in violation with the half-duplexing constraint (e.g., simultaneously, as used above, may refer to within some time window resulting in conflicting resource use). As such, techniques described below may address such conflicting scheduling commands.

Techniques further described below may be applied to wireless networks that use space division multiplexing (SDM) via beamforming or MIMO techniques (e.g., backhaul network 200). Such SDM techniques may reduce inter-link interference. Therefore, frequency resource reuse may be enhanced, which may lead to higher spectral efficiency.

In some cases, backhaul network 200 may include base stations 105 operating in millimeter wave (mmW) frequency ranges that may be associated with a reduced coverage area (e.g., a smaller geographic footprint, directional transmissions, etc.). In such mmW systems, signal processing techniques, such as beamforming, may be used to coherently combine energy and overcome path losses at these frequencies. Wireless links 210 achieved through beamforming may be associated with narrow beams (e.g., "pencil beams") that are highly directional, minimize inter-link interference, and provide high-bandwidth links between wireless nodes (e.g., base stations, access nodes, etc.). That is, in such mmW examples, base stations 105 (e.g., at each wireless link 210 end point) may use narrow beams. The narrow beams may be created through antenna arrays. The beams may be controlled, for example, via a phase ramp on the antenna array. Such phase ramps may be realized in digital or analogue form. It is also possible to use different arrays to support independent links. Combinations of such techniques or other methods of creating such beams is also possible. Such narrow antenna beams may be provided by mmW RATs, for instance, as supported by IEEE802.11ad. These RATs may also be used for the wireless links 210 (e.g., for wireless backhaul links, fronthaul links, access links etc.) used in backhaul network 200.

Such SDM techniques may provide sufficient inter-link separation to simultaneously transfer data using the same time and/or frequency resources. However, such techniques may not provide sufficient isolation between antenna panels, antennal elements, antenna beams, or antennal patterns to adequately address the half-duplexing problem. A relay node (e.g., base stations 105) supporting SDM techniques may therefore use the same time and frequency resources to either transmit data or receive data on links with multiple peers (e.g., using different wireless links 210). However, a relay node may not simultaneously support transmission and reception of data on a wireless link 210. If a relay node holds a master node role (e.g., base station 105-a in the above example), the relay node may address the half-duplexing constraint by aligning transmission and reception among wireless links 210 via scheduling commands. If a relay node holds a slave node role of two or more wireless links 210 (e.g., base station 105-c in the above example), the relay node may experience or realize a scheduling conflict (e.g., in the case when the relay node received scheduling requests on some wireless links 210 and transmits scheduling grants on other wireless links 210, for example, when a relay node acts as a slave node on some wireless links and acts as a master node on other wireless links).

That is, in some wireless communications systems, relay nodes within the network may behave according to certain master node/slave node patterns. For example, in one topology, each relay node may behave or act as a single mode (e.g., each base station 105 may act as either a master node or a slave node on all wireless links 210). Such topologies may have the advantage that control information (e.g., scheduling information) may be synchronized by having all master nodes transmit control messages at the same time while slave nodes receive control channels at the same time. In such topologies, latency due to control signaling may be reduced (e.g., as in the next described topology, southern most relay nodes may receive control information, necessarily, from several relays). As another example, a second topology may assign master/slave node roles according to the directionality of the wireless link. For example, from north to south, the northernmost endpoint of a wireless link 210 may act as a master node and the southernmost endpoint of a wireless link 210 may act as a slave node. In such topologies, each relay node holds a mode for communication with northbound nodes (e.g., a slave node) and holds the other mode for communication with southbound nodes (e.g., a master node). Further, the relay's slave node follows scheduling commands from northern master nodes and the relay's master node may use remaining resources to schedule its southern slave nodes. However, in either case, a relay node may encounter the scenario where it acts as a slave node to two or more master nodes where scheduling conflicts may arise (e.g., the two or more master nodes may send scheduling commands for conflicting resource space at the slave node).

Therefore, the techniques described below may be implemented by backhaul network 200 such that conflicting scheduling commands may be managed more appropriately.

When receiving scheduling commands a slave relay node (e.g., base station 105-c) may evaluate if any of the commands creates a conflict (e.g., of resources indicated for use by the node). In the case where there is no resource conflict associated with received scheduling commands, base station 105-c may proceed to execute the scheduling commands. If there is a conflict only for a subset of resources (e.g., time slots), base station 105-c may execute the commands for the remaining resources. That is, in the presence of a resource conflict for a set of resources, base station 105-c may select a subset of scheduling commands that are not in mutual conflict. The non-conflicting subset of scheduling commands may be executed, and the scheduling commands associated with the conflict may be omitted.

The non-conflicting subset of scheduling commands may be identified or selected based on a conflict policy. The conflict policy may be based on the size of the non-conflicting (e.g., conflict free) subset. For example, the base station 105-c may select the non-conflicting subset that is the largest. The conflict policy may also be based on the wireless links 210 where the scheduling commands originate (e.g., some wireless links 210 may be given a higher priority, the priority may be provisioned, configured, or derived from signaling received on the wireless links 210). Further, the conflict policy may be based on the type of the scheduling command (e.g., scheduling requests may be given priority over scheduling grants). Priority information included in the conflicting scheduling commands may also influence the conflict policy. In some cases, a selection algorithm may prioritize wireless links 210 in a round-robin manner. Other factors the conflict policy may take into account include the load on buffers for each wireless link 210 on the relay, the load on buffers of peer nodes (e.g., base station 105-a and/or base station 105-b), ranking of wireless links 210 or routes in the mesh networks 205 (e.g., which may be derived from link-quality measurements or routing information), the degree of isolation between the antenna ports related to the conflicting scheduling commands, etc.

Alternatively, slave nodes encountering such scheduling conflicts (e.g., base station 105-c) may reduce or resolve the conflict via conflict reporting to corresponding master nodes (e.g., base station 105-a and base station 105-b). For example, base station 105-c may inform some or all of the master nodes (e.g., base station 105-a and base station 105-b) of the scheduling conflict. Further, base station 105-c may select which master nodes to send the conflict related information to be based on a selection policy. The selection policy may include criteria such as all master nodes, master nodes associated with received scheduling commands, master nodes whose scheduling commands would be omitted or whose scheduling commands would be executed in case the conflict cannot be resolved, a subset of master nodes defined via a provisioned or predetermined list, configured, or signaled. The selection policy may additionally take into account the type or rank of the scheduling command, the type or rank of the wireless link 210, and/or any other explicit information included in the scheduling command. Information included in the conflict reporting may include information on master nodes sending conflicting commands (e.g., master node identification information), information on resources where the conflict occurs, etc.

Accordingly, master nodes receiving the conflict reporting may revise the scheduling command (e.g., determine or generate an updated scheduling command). The revision may be done by each master node independently, or the scheduling revision may be coordinated among master nodes via scheduling negotiation signaling (e.g., as further discussed below with reference to FIG. 4). Such scheduling conflict management techniques may include sending scheduling commands for future slots to leave room to insert such signaling handshakes for conflict resolution (e.g., to preemptively accommodate for any negotiation signaling). Master nodes may schedule resources for multiple slots in one message, and conflicts may occur for a subset of such slots. In such cases, techniques may be performed for the subset of the time slots. Conflict reporting may indicate the specific resources where the conflict occurs, which may include time, frequency, code, and/or angular space conflicts.

The signaling messages used for scheduling commands or for conflict reporting, in addition to negotiation signaling between master nodes, may be performed via a physical control channel, a MAC layer control channel, or an upper layer control channel. The signaling messages may be multiplexed in the spatial, frequency, time, or code dimension on the various wireless links 210. The signaling messages may be carried in channels pertaining to a frame structure. In some cases, the frames among the various wireless links 210 may be time synchronized, which may ease application of multiplexing schemes to the signaling on the various wireless links 210.

In some cases, backhaul network 200 may include cellular RATs (e.g., 3GPP RATs). Scheduling commands may use physical downlink control channels (PDCCH), physical downlink shared channels (PDSCH) (e.g., in case the control is performed by MAC layer or higher layers), etc. Signaling to report scheduling conflict from slave nodes to master nodes may use physical uplink control channels (PUCCH), physical uplink shared channel (PUSCH) (e.g., in case the control is performed by MAC layer or higher layers), etc.

In some cases, the antenna ports or antenna beams where the scheduling commands are executed may be associated with the antenna ports or antenna beams where the scheduling commands were received. In cases where beam-based SDM schemes are used, the schemes may be based on antenna patterns (e.g., antenna beams, antenna ports, antenna panels, antenna elements, etc.). A relay node that has a master node controlling one set of wireless links 210 and a slave node being controlled by another set of master nodes may use resource partitions to separate between master node operation and slave node operation. In some cases, the relay node may receive scheduling commands and execute the commands in one time partition and transmit scheduling commands and execute the corresponding communications in another partition. The partitions may refer to time, frequency, code, or angular space. The partitions may be non-overlapping. The beams used in the first partition may be the same, different, or overlapping with the beams used for the second partition.

Figure 3:
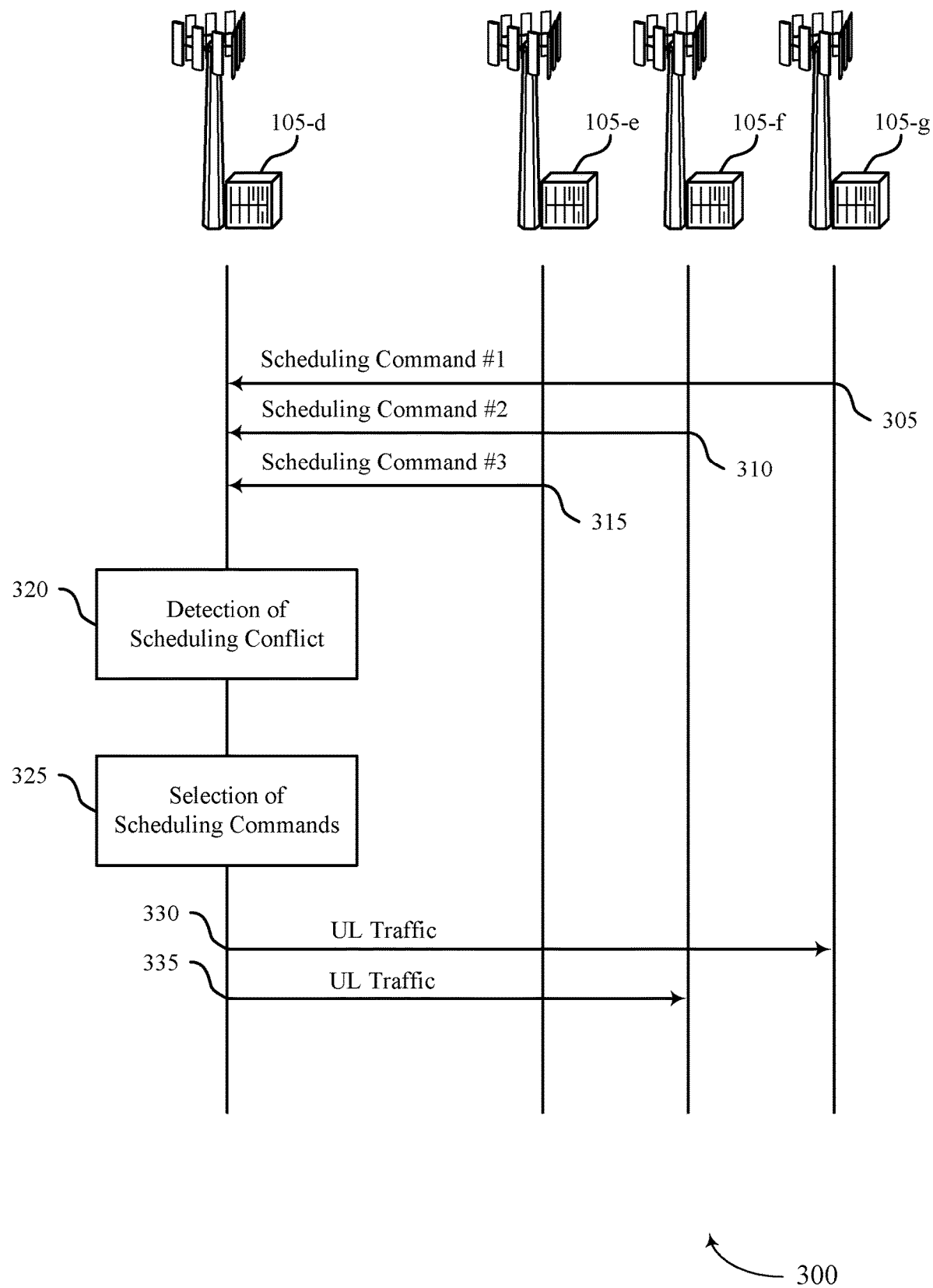
FIGS. 3 and 4 illustrates examples of process flows that support management of conflicting scheduling commands in wireless networks in accordance with aspects of the present disclosure.

FIG. 3 illustrates an example of a process flow 300 that supports management of conflicting scheduling commands in wireless networks in accordance with various aspects of the present disclosure. In some examples, process flow 300 may implement aspects of wireless communications system 100 and/or backhaul network 200. Process flow 300 may include base station 105-d (e.g., a slave node), base station 105-e, base station 105-f, and base station 105-g (e.g., master nodes), which may refer to corresponding devices as discussed with reference to FIGS. 1 and 2.

At 305, 310, and 315, base station 105-d may receive scheduling commands (scheduling requests, scheduling grants, or both) from base station 105-g, base station 105-f, and base station 105-e, respectively. The scheduling commands may be received via wireless links associated with base station 105-*g*, base station 105-*f*, and base station 105-*e*. The wireless links may include mmW wireless backhaul links, fronthaul links, access links, etc. The scheduling commands may be received over a physical control channel, a MAC channel, an upper layer channel, etc. and may, in some cases, be received according to a time-synchronized frame structure and/or a beam-formed antenna patter.

At 320, base station 105-*d* may detect a scheduling conflict (e.g., base station 105-*d* may identify conflicting resources indicated for use by the received scheduling commands). Identified conflicting resources may include time resources, frequency resources, and/or code resources associated with scheduling commands received at 305, 310, and 315.

At 325, base station 105-*d* may select a subset of scheduling commands for execution. The subset of scheduling commands may be associated with non-conflicting resources. The subset may further be selected according to a conflict policy. In some cases, base station 105-*d* may receive, or have previously received, signaling indicated the conflict policy. The conflict policy may be based on priority information signaled in the scheduling commands, a size of the selected non-conflicting subset (e.g., the largest subset), a priority level associated with one or more of the wireless links, a scheduling command type associated with the scheduling commands (e.g., a scheduling request or a scheduling grant), a non-prioritized scheduling algorithm (e.g., a round-robin algorithm), a route priority associated with a subset of the wireless links, a buffer size associated with one or more of the wireless links, a degree of isolation between one or more antenna ports associated with the scheduling commands, etc.

At 330 and 335, base station 105-*d* may execute the subset of non-conflicting scheduling commands based on the selection performed at 325. The example of FIG. 3 is intended for illustrative purposes only. Techniques described herein may be applicable to other scenarios of scheduling command conflicts, conflict reporting, scheduling negotiation, etc. by analogy, without departing from the scope of the present disclosure.

Figure 4:
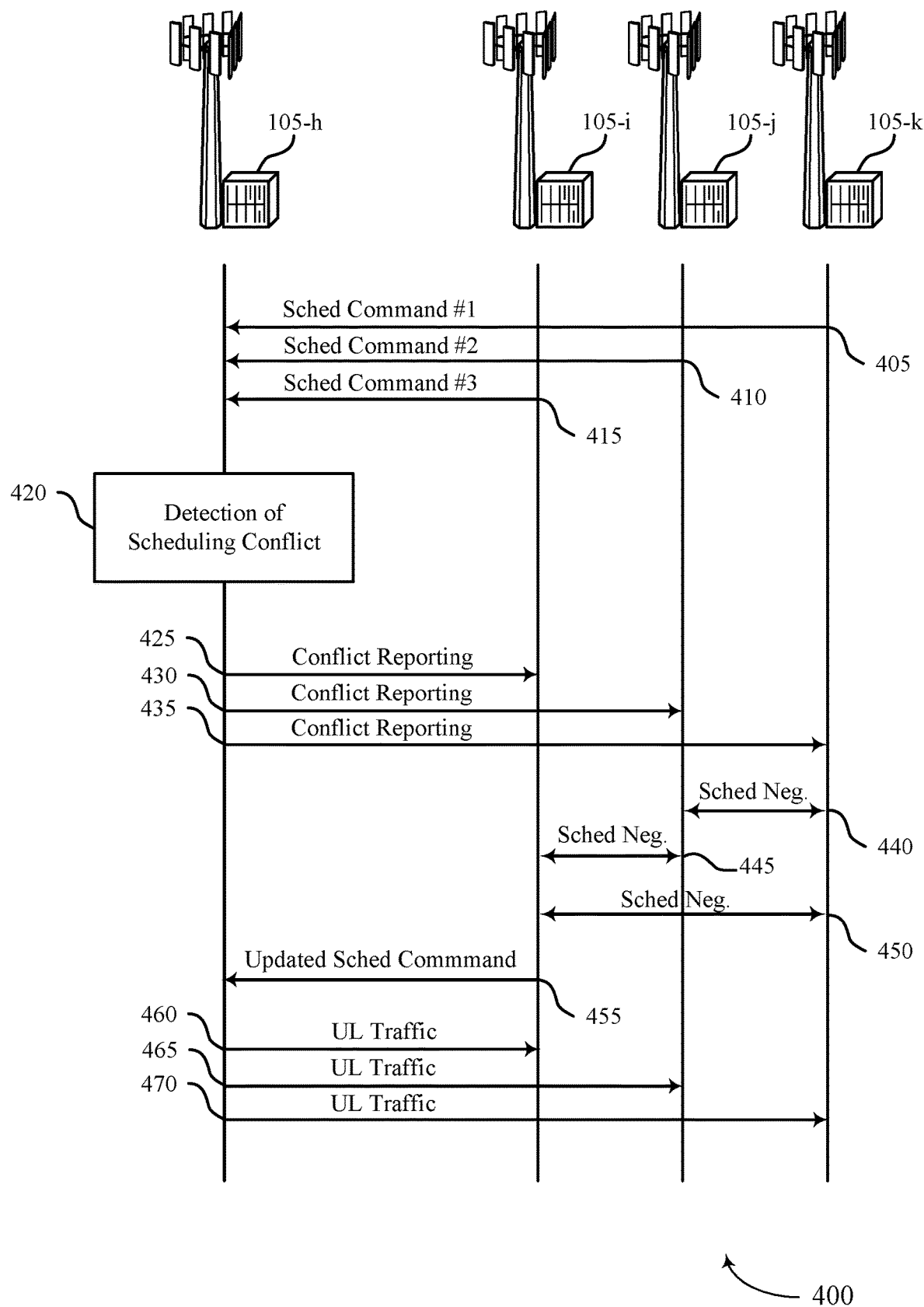

FIG. 4 illustrates an example of a process flow 400 that supports management of conflicting scheduling commands in wireless networks in accordance with various aspects of the present disclosure. In some examples, process flow 400 may implement aspects of wireless communications system 100 and/or backhaul network 200. Process flow 400 may include base station 105-*h* (e.g., a slave node), base station 105-*i*, base station 105-*j*, and base station 105-*k* (e.g., master nodes), which may refer to corresponding devices as discussed with reference to FIGS. 1 and 2.

At 405, 410, and 415, base station 105-*h* may receive scheduling commands (scheduling requests, scheduling grants, or both) from base station 105-*i*, base station 105-*j*, and base station 105-*k*, respectively. The scheduling commands may be received via wireless links associated with base station 105-*i*, base station 105-*j*, and base station 105-*k*. The wireless links may include mmW wireless backhaul links, fronthaul links, access links, etc. The scheduling commands may be received over a physical control channel, a MAC channel, an upper layer channel, etc. and may, in some cases, be received according to a time-synchronized frame structure and/or a beam-formed antenna patter.

At 420, base station 105-*h* may detect a scheduling conflict (e.g., base station 105-*h* may identify conflicting resources indicated for use by the received scheduling commands). Identified conflicting resources may include time resources, frequency resources, and/or code resources associated with scheduling commands received at 405, 410, and 415.

At 425, 430, and 435, base station 105-*h* may engage in conflict reporting according to a conflict reporting policy (e.g., a conflict policy). The conflict report may include information indicating one or more nodes that transmitted the scheduling commands, information indicating the wireless resources associated with the identified conflict, and/or information indicating a direction of data transmission (e.g., uplink or downlink). Further, to whom the conflict reporting is signaled to (e.g., whether any, some, or all of 425, 430, and 435 are performed) may be based on a selection policy. The selection policy (e.g., used to select nodes for conflict reporting) may be based on a priority associated with a wireless link associated with the node, a type of scheduling command received from the node, a priority associated with a scheduling command received from the node, and/or a configured subset of nodes that includes the node.

At 440, 445, and 450, base station 105-*i*, base station 105-*j*, and base station 105-*k* may engage in negotiation signaling based on received conflict reporting from base station 105-*h*. On or more of base station 105-*i*, base station 105-*j*, and base station 105-*k* may then, based on the negotiation signaling, generate an updated scheduling command and transmit the updated scheduling command to base station 105-*h*. For example, in the present illustration, base station 105-*e* may transmit the updated scheduling command to base station 105-*h*.

At 460, 465, and 470, base station 105-*h* may execute the updated scheduling command. The example of FIG. 4 is intended for illustrative purposes only. Techniques described herein may be applicable to other scenarios of scheduling command conflicts, conflict reporting, scheduling negotiation, etc. by analogy, without departing from the scope of the present disclosure.

Figure 5:
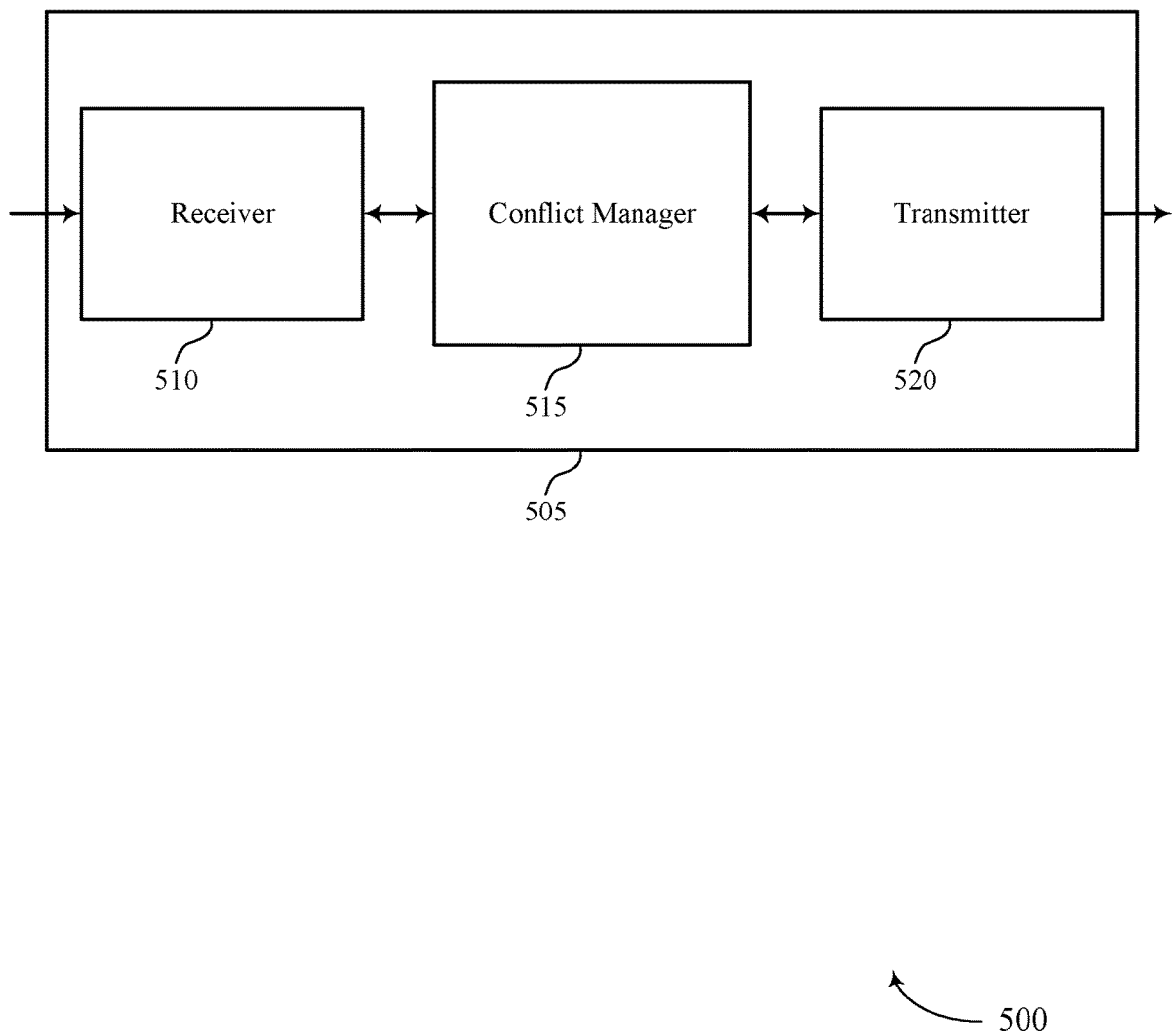
FIGS. 5 through 7 show block diagrams of a device that supports management of conflicting scheduling commands in wireless networks in accordance with aspects of the present disclosure.

FIG. 5 shows a block diagram 500 of a wireless device 505 that supports management of conflicting scheduling commands in wireless networks in accordance with aspects of the present disclosure. Wireless device 505 may be an example of aspects of a base station 105 as described herein. Wireless device 505 may include receiver 510, conflict manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to management of conflicting scheduling commands in wireless networks, etc.). Information may be passed on to other components of the device. The receiver 510 may be an example of aspects of the transceiver 835 described with reference to FIG. 8. The receiver 510 may utilize a single antenna or a set of antennas.

Receiver 510 may receive scheduling commands and. or data (e.g., based on received scheduling commands) over wireless links. Such wireless links may include mmW wireless backhaul links, fronthaul links, access links, etc.

Conflict manager 515 may be an example of aspects of the conflict manager 815 described with reference to FIG. 8. Conflict manager 515 and/or at least some of its various sub-components may be implemented in hardware, software executed by a processor, firmware, or any combination thereof. If implemented in software executed by a processor, the functions of the conflict manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The conflict manager 515 and/or at least some of its various sub-components may be physically located at various positions, including being distributed such that portions of functions are implemented at different physical locations by one or more physical devices. In some examples, conflict manager 515 and/or at least some of its various sub-components may be a separate and distinct component in accordance with various aspects of the present disclosure. In other examples, conflict manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Conflict manager 515 may receive a set of scheduling commands over a set of wireless links, identify a conflict for a wireless resource associated with the set of scheduling commands, and select a non-conflicting subset of the set of scheduling commands based on a conflict policy. The conflict manager 515 may also receive a set of scheduling commands over a set of wireless links, identify a conflict for a wireless resource associated with the set of scheduling commands, transmit a conflict report indicating the identified conflict, and receive an updated scheduling command based on the set of scheduling commands and the conflict report. The conflict manager 515 may also transmit a scheduling command over a wireless link, receive a conflict report indicating a conflict for a wireless resource associated with the transmitted scheduling command and at least one additional scheduling command, and transmit an updated scheduling command based on the transmitted scheduling command and the conflict report.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Transmitter 520 may transmit scheduling commands and/or data over one or more of the set of wireless links based. In some cases, transmitter 520 may transmit data associated with the selected non-conflicting subset and/or transmit data over one or more of the set of wireless links based on the updated scheduling command.

Figure 6:
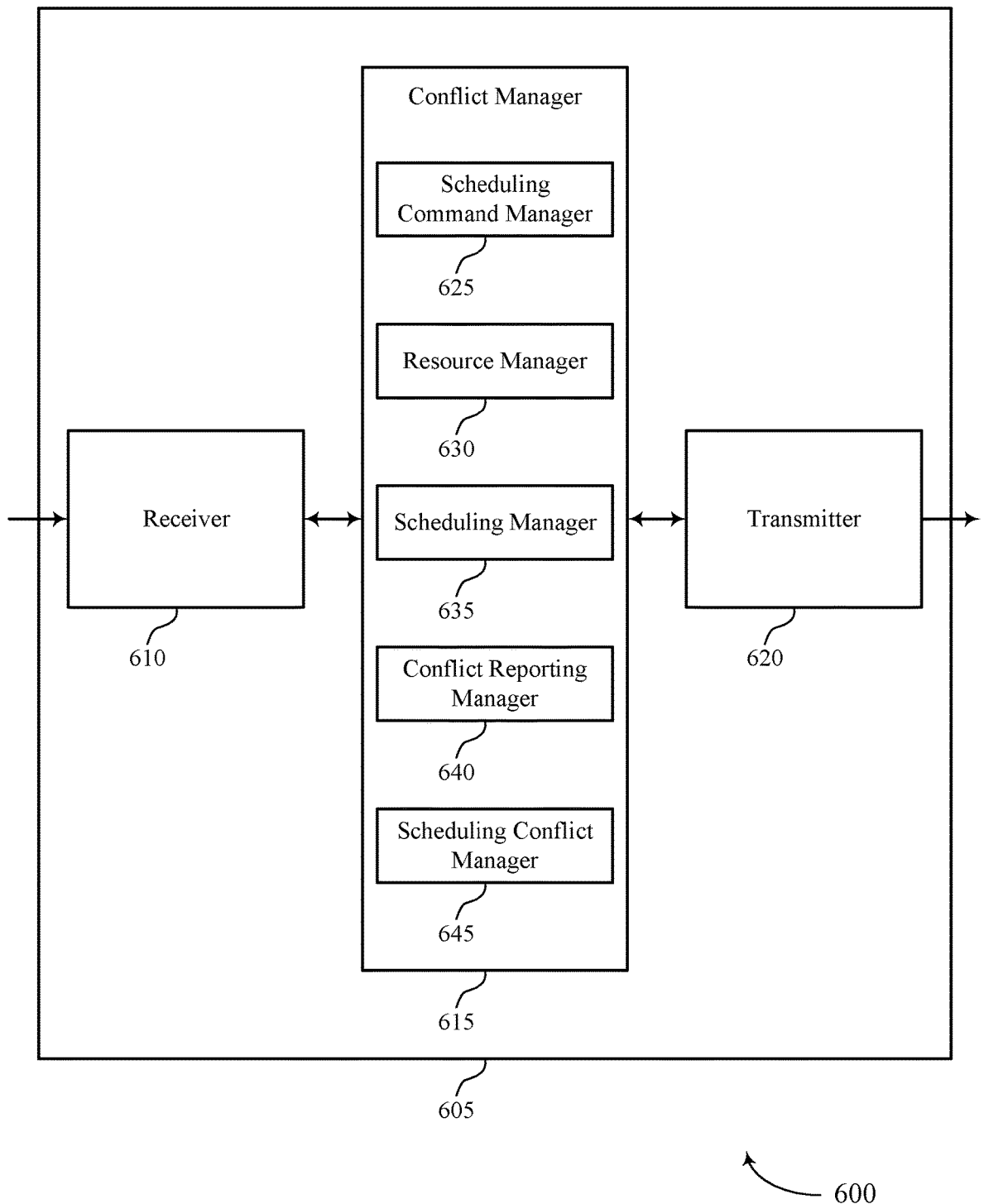

FIG. 6 shows a block diagram 600 of a wireless device 605 that supports management of conflicting scheduling commands in wireless networks in accordance with aspects of the present disclosure. Wireless device 605 may be an example of aspects of a wireless device 505 or a base station 105 as described with reference to FIG. 5. Wireless device 605 may include receiver 610, conflict manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to management of conflicting scheduling commands in wireless networks, etc.). Information may be passed on to other components of the device. The receiver 610 may be an example of aspects of the transceiver 835 described with reference to FIG. 8. The receiver 610 may utilize a single antenna or a set of antennas.

Conflict manager 615 may be an example of aspects of the conflict manager 815 described with reference to FIG. 8. Conflict manager 615 may also include scheduling command manager 625, resource manager 630, scheduling manager 635, conflict reporting manager 640, and scheduling conflict manager 645.

Scheduling command manager 625 may receive a set of scheduling commands over a set of wireless links, transmit a second set of scheduling commands within a second time window that is non-overlapping with the first time window, receive the set of scheduling commands within a first time window, transmit a scheduling command over a wireless link, transmit an updated scheduling command based on the transmitted scheduling command and the conflict report, transmit the scheduling command based on a timing delay between transmission of the scheduling command and data associated with the scheduling command, and receive an updated scheduling command based on the set of scheduling commands and the conflict report. In some cases, the wireless link includes a wireless backhaul link, a fronthaul link, or an access link.

Resource manager 630 may identify a conflict for a wireless resource associated with the set of scheduling commands. In some cases, the wireless resource includes a time resource, a frequency resource, a code resource, a spatial resource, or a combination thereof.

Scheduling manager 635 may select a non-conflicting subset of the set of scheduling commands based on a conflict policy. In some cases, the set of scheduling commands are received according to beam-formed antenna pattern. In some cases, the conflict policy is based on a size of the selected non-conflicting subset. In some cases, the size of the selected non-conflicting subset is larger than other non-conflicting subsets of the set of scheduling commands. In some cases, the conflict policy is based on a priority level associated with one or more of the set of wireless links. In some cases, the conflict policy is based on a scheduling command type associated with the set of scheduling commands. In some cases, the scheduling command type includes a scheduling request or a scheduling grant. In some cases, the conflict policy is based on a non-prioritized scheduling algorithm. In some cases, the conflict policy is based on priority information signaled in one or more of the set of scheduling commands. In some cases, the conflict policy is based on a route priority associated with a subset of the set of wireless links. In some cases, the conflict policy is based on a buffer size associated with one or more of the set of wireless links. In some cases, the conflict policy is based on a degree of isolation between one or more antenna ports associated with the set of scheduling commands. In some cases, the wireless links include mmW wireless backhaul links. In some cases, the set of scheduling commands includes a scheduling request, a scheduling grant, or both. In some cases, the set of scheduling commands are received over a physical control channel, a MAC channel, an upper layer channel, or a combination thereof. In some cases, the set of scheduling commands are received according to a time-synchronized frame structure. In some cases, the non-prioritized scheduling algorithm includes a round-robin algorithm.

Conflict reporting manager 640 may transmit a conflict report indicating the identified conflict. In some cases, the conflict report includes information indicating one or more nodes that transmitted the set of scheduling commands, information indicating the wireless resources associated with the identified conflict, information indicating a direction of data transmission, or a combination thereof.

Scheduling conflict manager 645 may receive a conflict report indicating a conflict for a wireless resource associated with the transmitted scheduling command and at least one additional scheduling command.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
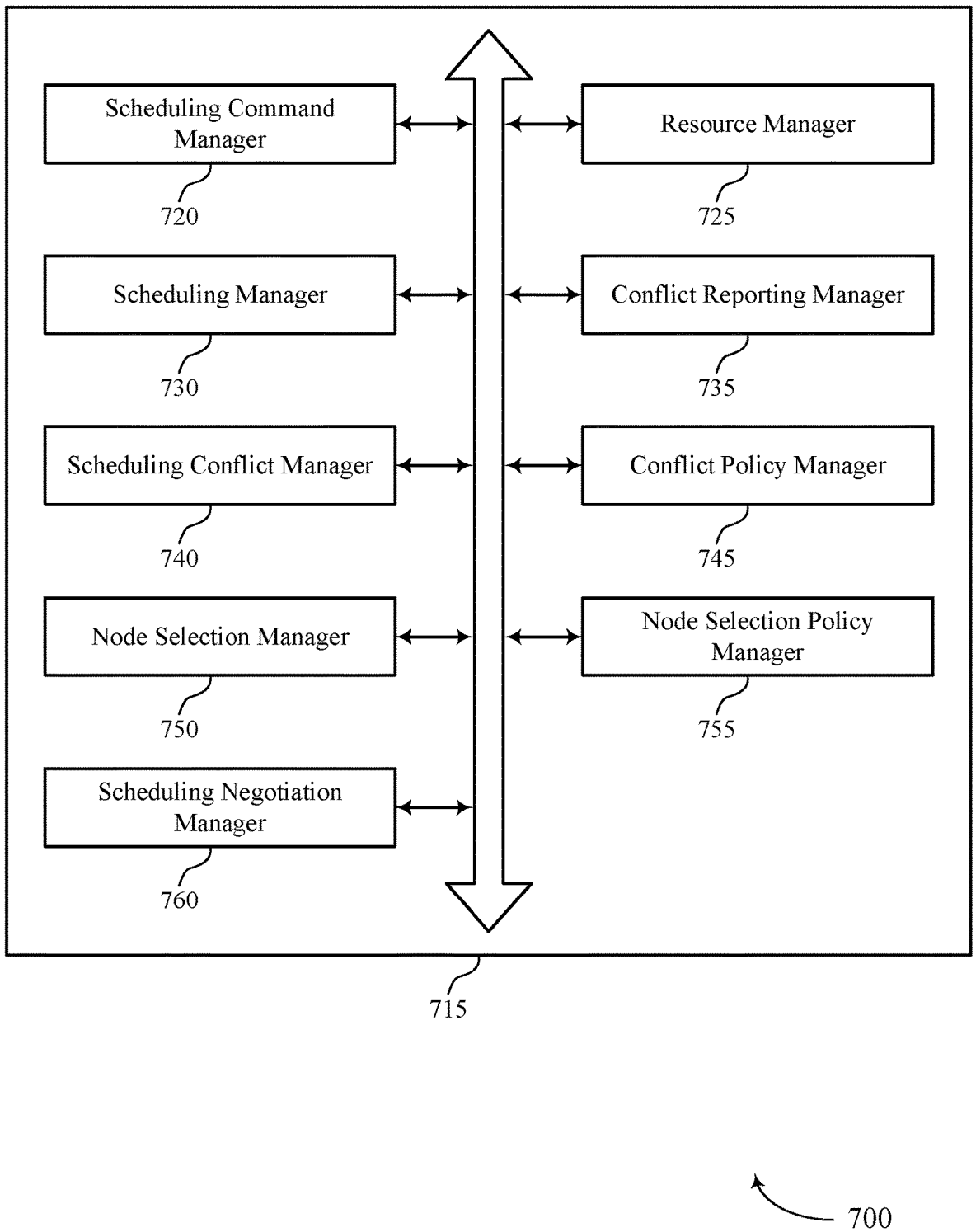

FIG. 7 shows a block diagram 700 of a conflict manager 715 that supports management of conflicting scheduling commands in wireless networks in accordance with aspects of the present disclosure. The conflict manager 715 may be an example of aspects of a conflict manager 515, a conflict manager 615, or a conflict manager 815 described with reference to FIGS. 5, 6, and 8. The conflict manager 715 may include scheduling command manager 720, resource manager 725, scheduling manager 730, conflict reporting manager 735, scheduling conflict manager 740, conflict policy manager 745, node selection manager 750, node selection policy manager 755, and scheduling negotiation manager 760. Each of these modules may communicate, directly or indirectly, with one another (e.g., via one or more buses).

Scheduling command manager 720 may receive a set of scheduling commands over a set of wireless links, transmit a second set of scheduling commands within a second time window that is non-overlapping with the first time window, receive the set of scheduling commands within a first time window, transmit a scheduling command over a wireless link, transmit an updated scheduling command based on the transmitted scheduling command and the conflict report, transmit the scheduling command based on a timing delay between transmission of the scheduling command and data associated with the scheduling command, and receive an updated scheduling command based on the set of scheduling commands and the conflict report. In some cases, the wireless link includes a wireless backhaul link, a fronthaul link, or an access link.

Resource manager 725 may identify a conflict for a wireless resource associated with the set of scheduling commands. In some cases, the wireless resource includes a time resource, a frequency resource, a code resource, a spatial resource, or a combination thereof.

Scheduling manager 730 may select a non-conflicting subset of the set of scheduling commands based on a conflict policy. In some cases, the set of scheduling commands are received according to beam-formed antenna pattern. In some cases, the conflict policy is based on a size of the selected non-conflicting subset. In some cases, the size of the selected non-conflicting subset is larger than other non-conflicting subsets of the set of scheduling commands. In some cases, the conflict policy is based on a priority level associated with one or more of the set of wireless links. In some cases, the conflict policy is based on a scheduling command type associated with the set of scheduling commands. In some cases, the scheduling command type includes a scheduling request or a scheduling grant. In some cases, the conflict policy is based on a non-prioritized scheduling algorithm. In some cases, the conflict policy is based on priority information signaled in one or more of the set of scheduling commands. In some cases, the conflict policy is based on a route priority associated with a subset of the set of wireless links. In some cases, the conflict policy is based on a buffer size associated with one or more of the set of wireless links. In some cases, the conflict policy is based on a degree of isolation between one or more antenna ports associated with the set of scheduling commands. In some cases, the wireless links include mmW wireless backhaul links. In some cases, the set of scheduling commands includes a scheduling request, a scheduling grant, or both. In some cases, the set of scheduling commands are received over a physical control channel, a MAC channel, an upper layer channel, or a combination thereof. In some cases, the set of scheduling commands are received according to a time-synchronized frame structure. In some cases, the non-prioritized scheduling algorithm includes a round-robin algorithm.

Conflict reporting manager 735 may transmit a conflict report indicating the identified conflict. In some cases, the conflict report includes information indicating one or more nodes that transmitted the set of scheduling commands, information indicating the wireless resources associated with the identified conflict, information indicating a direction of data transmission, or a combination thereof.

Scheduling conflict manager 740 may receive a conflict report indicating a conflict for a wireless resource associated with the transmitted scheduling command and at least one additional scheduling command.

Conflict policy manager 745 may receive signaling indicating the conflict policy.

Node selection manager 750 may select a node, based on a selection policy, to which the conflict report is transmitted. In some cases, the selection policy is based on a priority associated with a wireless link associated with the node, a type of scheduling command received from the node, a priority associated with a scheduling command received from the node, a configured subset of nodes that includes the node, or a combination thereof.

Node selection policy manager 755 may receive signaling indicating the selection policy.

Scheduling negotiation manager 760 may transmit negotiation signaling to a node associated with the at least one additional scheduling command.

Figure 8:
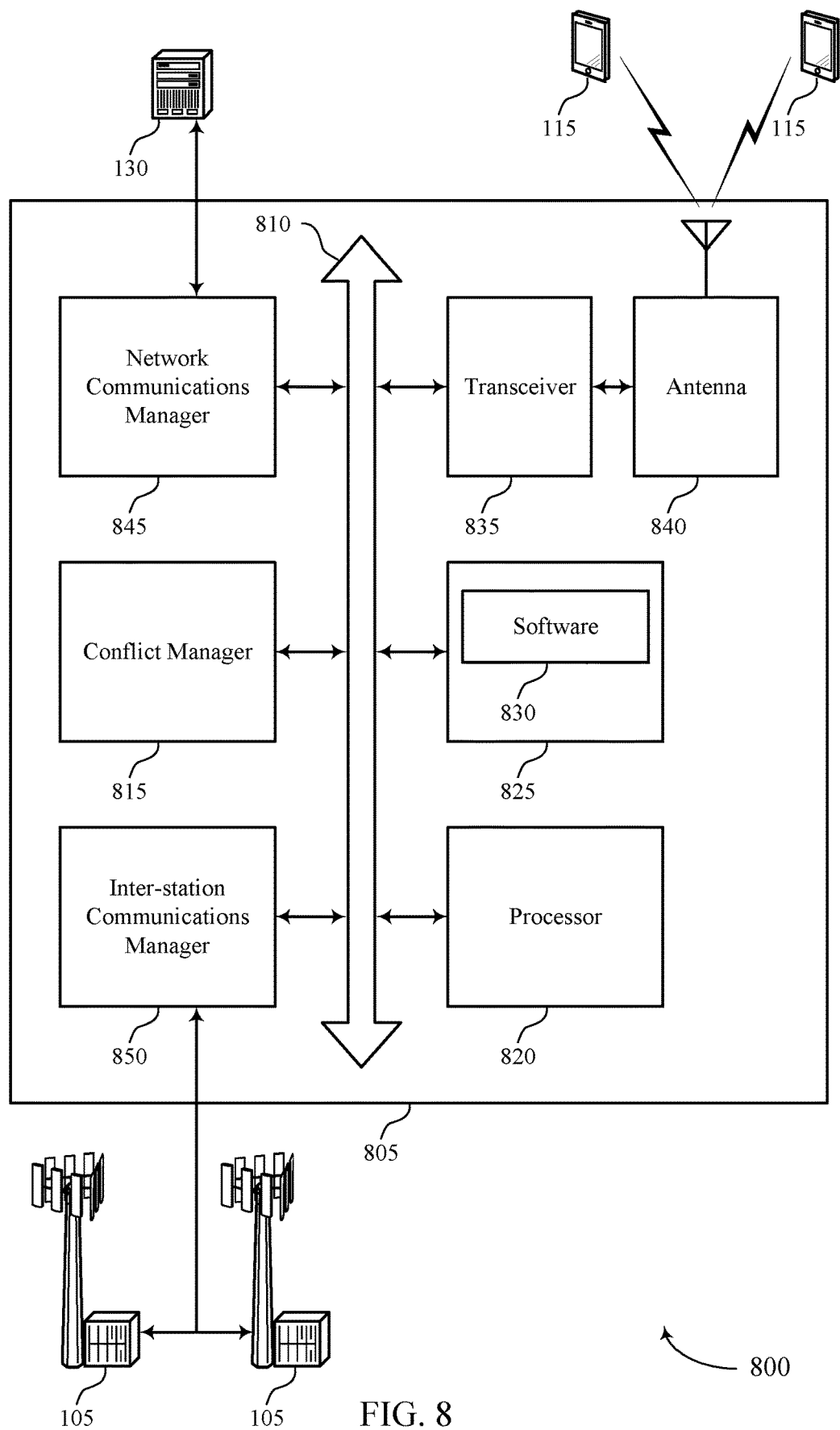
FIG. 8 illustrates a block diagram of a system including a base station that supports management of conflicting scheduling commands in wireless networks in accordance with aspects of the present disclosure.

FIG. 8 shows a diagram of a system 800 including a device 805 that supports management of conflicting scheduling commands in wireless networks in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including conflict manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more user equipment (UE)s 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting management of conflicting scheduling commands in wireless networks).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support management of conflicting scheduling commands in wireless networks. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
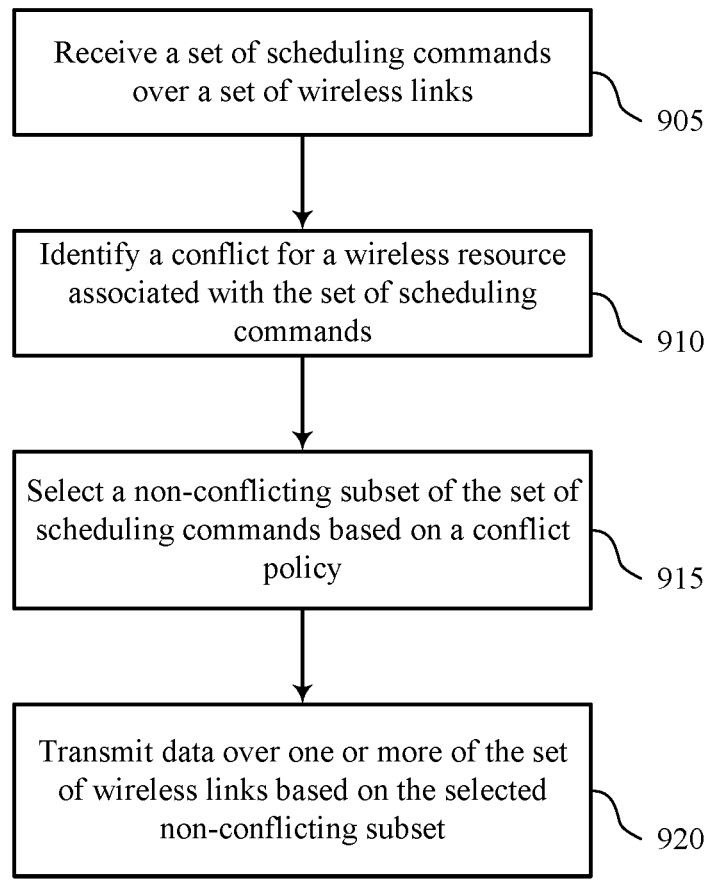
FIGS. 9 through 14 illustrate methods for management of conflicting scheduling commands in wireless networks in accordance with aspects of the present disclosure.

FIG. 9 shows a flowchart illustrating a method 900 for management of conflicting scheduling commands in wireless networks in accordance with aspects of the present disclosure. The operations of method 900 may be implemented by a base station 105 or its components as described herein. For example, the operations of method 900 may be performed by a conflict manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 905 the base station 105 may receive a plurality of scheduling commands over a plurality of wireless links. The operations of block 905 may be performed according to the methods described herein. In certain examples, aspects of the operations of block 905 may be performed by a scheduling command manager as described with reference to FIGS. 5 through 8.

At block 910 the base station 105 may identify a conflict for a wireless resource associated with the plurality of scheduling commands. The operations of block 910 may be performed according to the methods described herein. In certain examples, aspects of the operations of block 910 may be performed by a resource manager as described with reference to FIGS. 5 through 8.

At block 915 the base station 105 may select a non-conflicting subset of the plurality of scheduling commands based at least in part on a conflict policy. The operations of block 915 may be performed according to the methods described herein. In certain examples, aspects of the operations of block 915 may be performed by a scheduling manager as described with reference to FIGS. 5 through 8.

At block 920 the base station 105 may transmit data over one or more of the plurality of wireless links based at least in part on the selected non-conflicting subset. The operations of block 920 may be performed according to the methods described herein. In certain examples, aspects of the operations of block 920 may be performed by a transmitter as described with reference to FIGS. 5 through 8.

Figure 10:
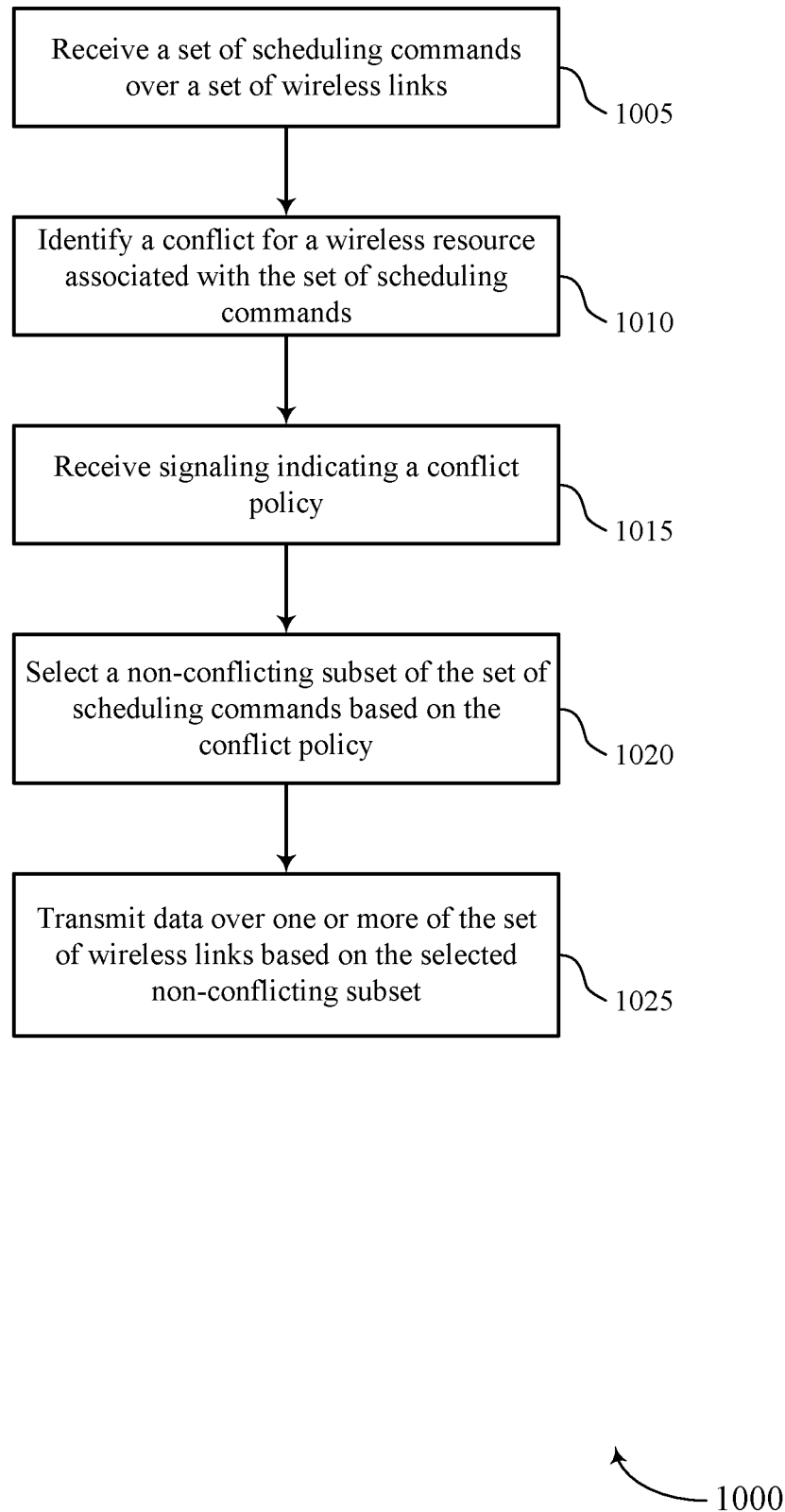

FIG. 10 shows a flowchart illustrating a method 1000 for management of conflicting scheduling commands in wireless networks in accordance with aspects of the present disclosure. The operations of method 1000 may be implemented by a base station 105 or its components as described herein. For example, the operations of method 1000 may be performed by a conflict manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1005 the base station 105 may receive a plurality of scheduling commands over a plurality of wireless links. The operations of block 1005 may be performed according to the methods described herein. In certain examples, aspects of the operations of block 1005 may be performed by a scheduling command manager as described with reference to FIGS. 5 through 8.

At block 1010 the base station 105 may identify a conflict for a wireless resource associated with the plurality of scheduling commands. The operations of block 1010 may be performed according to the methods described herein. In certain examples, aspects of the operations of block 1010 may be performed by a resource manager as described with reference to FIGS. 5 through 8.

At block 1015 the base station 105 may receive signaling indicating a conflict policy. The operations of block 1015 may be performed according to the methods described herein. In certain examples, aspects of the operations of block 1015 may be performed by a conflict policy manager as described with reference to FIGS. 5 through 8.

At block 1020 the base station 105 may select a non-conflicting subset of the plurality of scheduling commands based at least in part on the received conflict policy. The operations of block 1020 may be performed according to the methods described herein. In certain examples, aspects of the operations of block 1020 may be performed by a scheduling manager as described with reference to FIGS. 5 through 8.

At block 1025 the base station 105 may transmit data over one or more of the plurality of wireless links based at least in part on the selected non-conflicting subset. The operations of block 1025 may be performed according to the methods described herein. In certain examples, aspects of the operations of block 1025 may be performed by a transmitter as described with reference to FIGS. 5 through 8.

Figure 11:
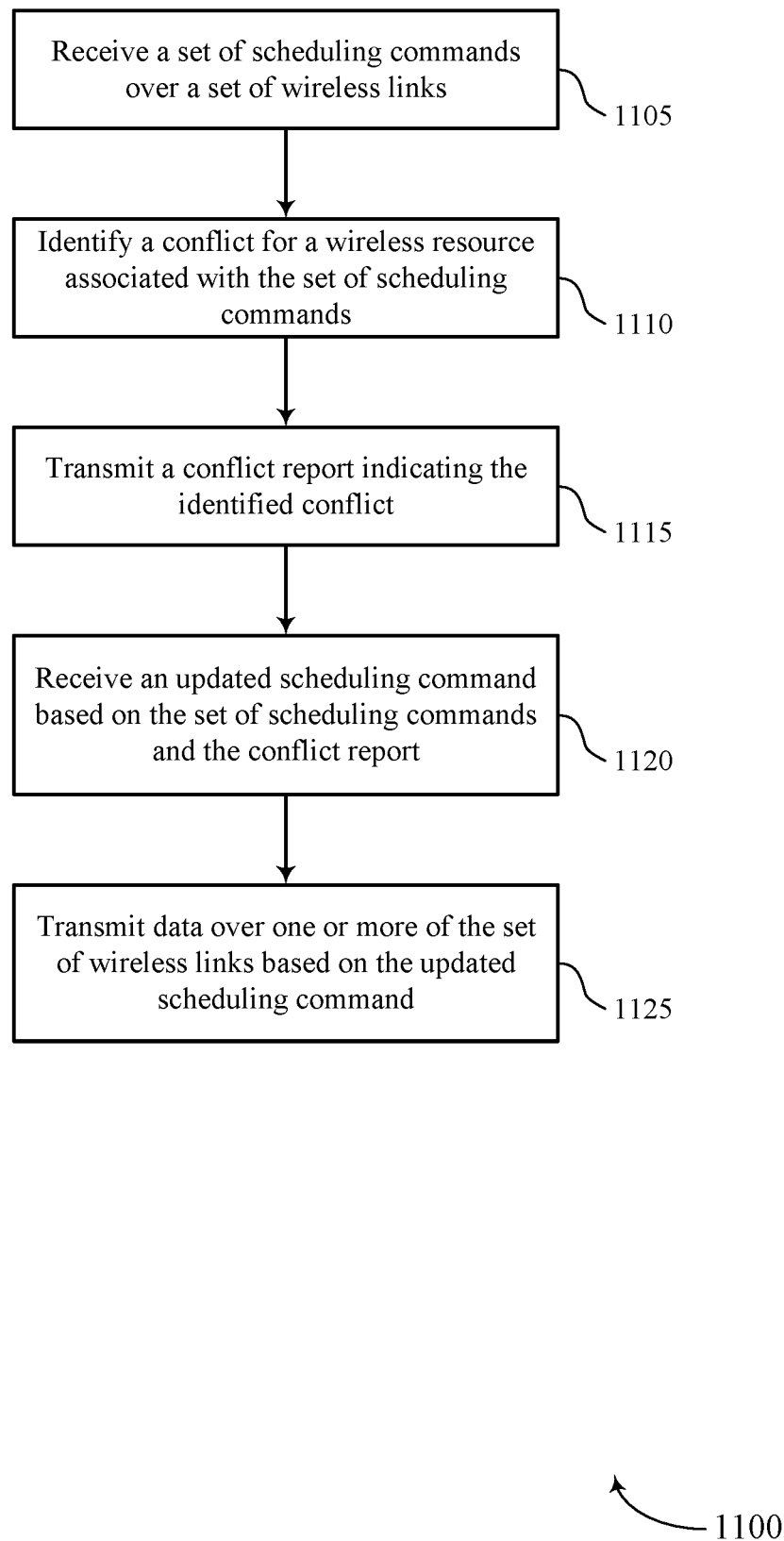

FIG. 11 shows a flowchart illustrating a method 1100 for management of conflicting scheduling commands in wireless networks in accordance with aspects of the present disclosure. The operations of method 1100 may be implemented by a base station 105 or its components as described herein. For example, the operations of method 1100 may be performed by a conflict manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1105 the base station 105 may receive a plurality of scheduling commands over a plurality of wireless links. The operations of block 1105 may be performed according to the methods described herein. In certain examples, aspects of the operations of block 1105 may be performed by a scheduling command manager as described with reference to FIGS. 5 through 8.

At block 1110 the base station 105 may identify a conflict for a wireless resource associated with the plurality of scheduling commands. The operations of block 1110 may be performed according to the methods described herein. In certain examples, aspects of the operations of block 1110 may be performed by a resource manager as described with reference to FIGS. 5 through 8.

At block 1115 the base station 105 may transmit a conflict report indicating the identified conflict. The operations of block 1115 may be performed according to the methods described herein. In certain examples, aspects of the operations of block 1115 may be performed by a conflict reporting manager as described with reference to FIGS. 5 through 8.

At block 1120 the base station 105 may receive an updated scheduling command based at least in part on the plurality of scheduling commands and the conflict report. The operations of block 1120 may be performed according to the methods described herein. In certain examples, aspects of the operations of block 1120 may be performed by a scheduling command manager as described with reference to FIGS. 5 through 8.

At block 1125 the base station 105 may transmit data over one or more of the plurality of wireless links based at least in part on the updated scheduling command. The operations of block 1125 may be performed according to the methods described herein. In certain examples, aspects of the operations of block 1125 may be performed by a transmitter as described with reference to FIGS. 5 through 8.

Figure 12:
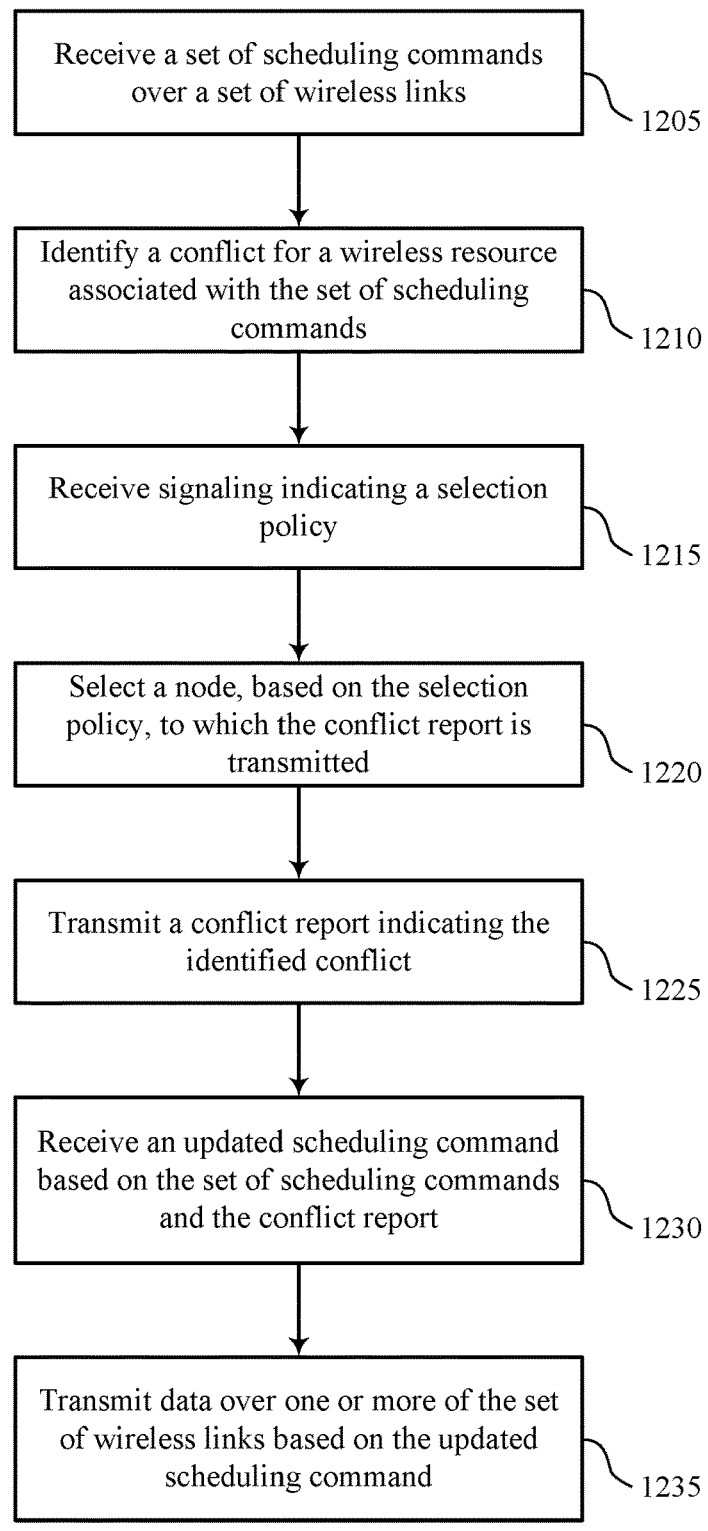

FIG. 12 shows a flowchart illustrating a method 1200 for management of conflicting scheduling commands in wireless networks in accordance with aspects of the present disclosure. The operations of method 1200 may be implemented by a base station 105 or its components as described herein. For example, the operations of method 1200 may be performed by a conflict manager as described with reference to FIGS. 5 through 8. In examples, a base station 105 may execute a set of codes to control the functional elements of the device to perform the functions described below. Additionally or alternatively, the base station 105 may perform aspects of the functions described below using special-purpose hardware.

At block 1205 the base station 105 may receive a plurality of scheduling commands over a plurality of wireless links. The operations of block 1205 may be performed according to the methods described herein. In certain examples, aspects of the operations of block 1205 may be performed by a scheduling command manager as described with reference to FIGS. 5 through 8.

At block 1210 the base station 105 may identify a conflict for a wireless resource associated with the plurality of scheduling commands. The operations of block 1210 may be performed according to the methods described herein. In certain examples, aspects of the operations of block 1210 may be performed by a resource manager as described with reference to FIGS. 5 through 8.

At block 1215 the base station 105 may receive signaling indicating a selection policy. The operations of block 1215 may be performed according to the methods described herein. In certain examples, aspects of the operations of block 1215 may be performed by a node selection policy manager as described with reference to FIGS. 5 through 8.

At block 1220 the base station 105 may select a node, based at least in part on the received selection policy, to which the conflict report is transmitted. The operations of block 1220 may be performed according to the methods described herein. In certain examples, aspects of the operations of block 1220 may be performed by a node selection manager as described with reference to FIGS. 5 through 8.

At block 1225 the base station 105 may transmit a conflict report indicating the identified conflict. The operations of block 1225 may be performed according to the methods described herein. In certain examples, aspects of the operations of block 1225 may be performed by a conflict reporting manager as described with reference to FIGS. 5 through 8.

At block 1230 the base station 105 may receive an updated scheduling command based at least in part on the plurality of scheduling commands and the conflict report. The operations of block 1230 may be performed according to the methods described herein. In certain examples, aspects of the operations of block 1230 may be performed by a scheduling command manager as described with reference to FIGS. 5 through 8.

At block 1235 the base station 105 may transmit data over one or more of the plurality of wireless links based at least in part on the updated scheduling command. The operations of block 1235 may be performed according to the methods described herein. In certain examples, aspects of the operations of block 1235 may be performed by a transmitter as described with reference to FIGS. 5 through 8.

Figure 13:
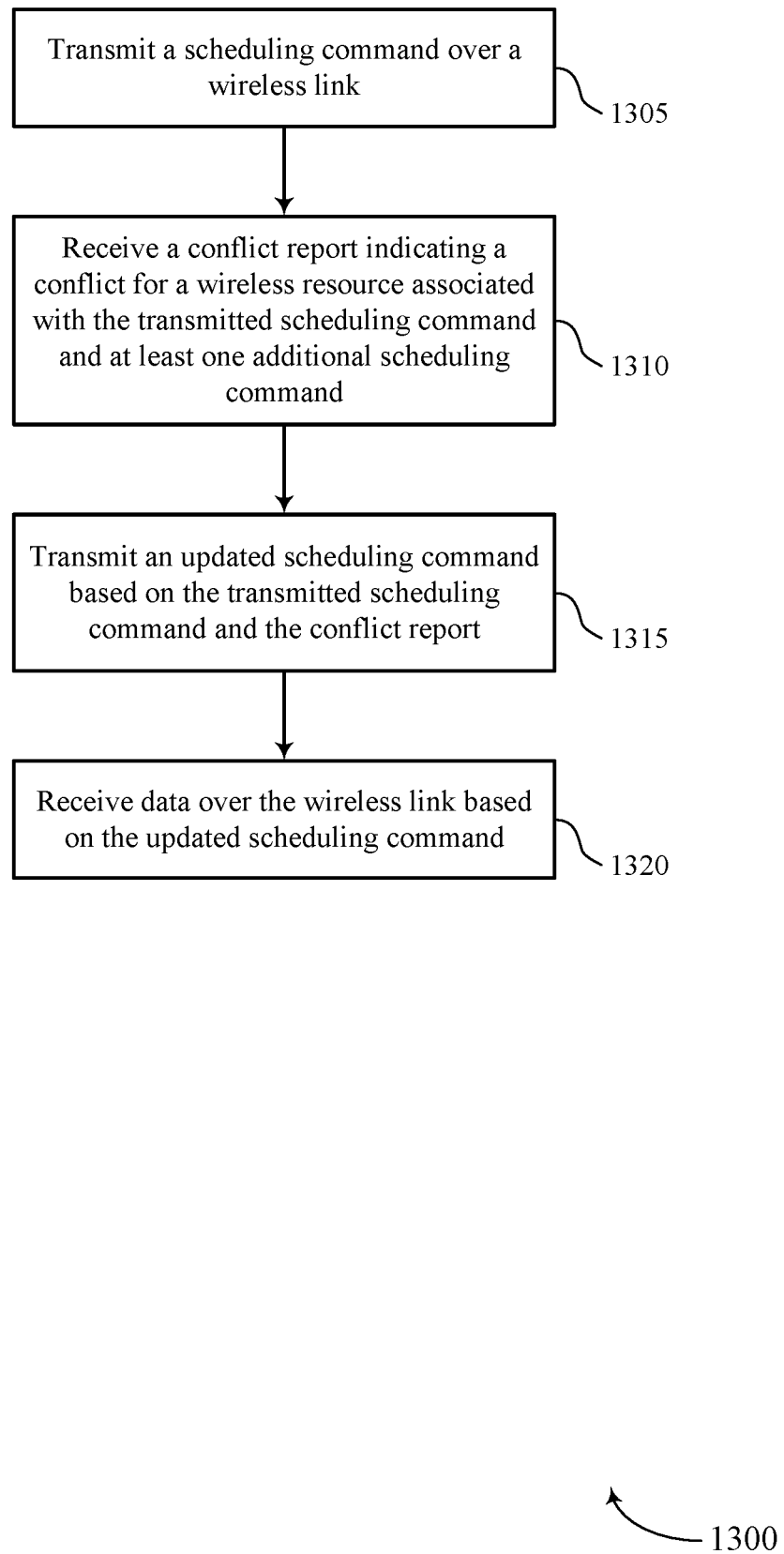

FIG. 13 shows a flowchart illustrating a method 1300 for management of conflicting scheduling commands in wireless networks in accordance with aspects of the present disclosure. The operations of method 1300 may be implemented by a base station 105 or its components as described herein. For example, the operations of method 1300 may be performed by a conflict manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may transmit a scheduling command over a wireless link. The operations of block 1305 may be performed according to the methods described herein. In certain examples, aspects of the operations of block 1305 may be performed by a scheduling command manager as described with reference to FIGS. 5 through 8.

At block 1310 the base station 105 may receive a conflict report indicating a conflict for a wireless resource associated with the transmitted scheduling command and at least one additional scheduling command. The operations of block 1310 may be performed according to the methods described herein. In certain examples, aspects of the operations of block 1310 may be performed by a scheduling conflict manager as described with reference to FIGS. 5 through 8.

At block 1315 the base station 105 may transmit an updated scheduling command based at least in part on the transmitted scheduling command and the conflict report. The operations of block 1315 may be performed according to the methods described herein. In certain examples, aspects of the operations of block 1315 may be performed by a scheduling command manager as described with reference to FIGS. 5 through 8.

At block 1320 the base station 105 may receive data over the wireless link based at least in part on the updated scheduling command. The operations of block 1320 may be performed according to the methods described herein. In certain examples, aspects of the operations of block 1320 may be performed by a receiver as described with reference to FIGS. 5 through 8.

Figure 14:
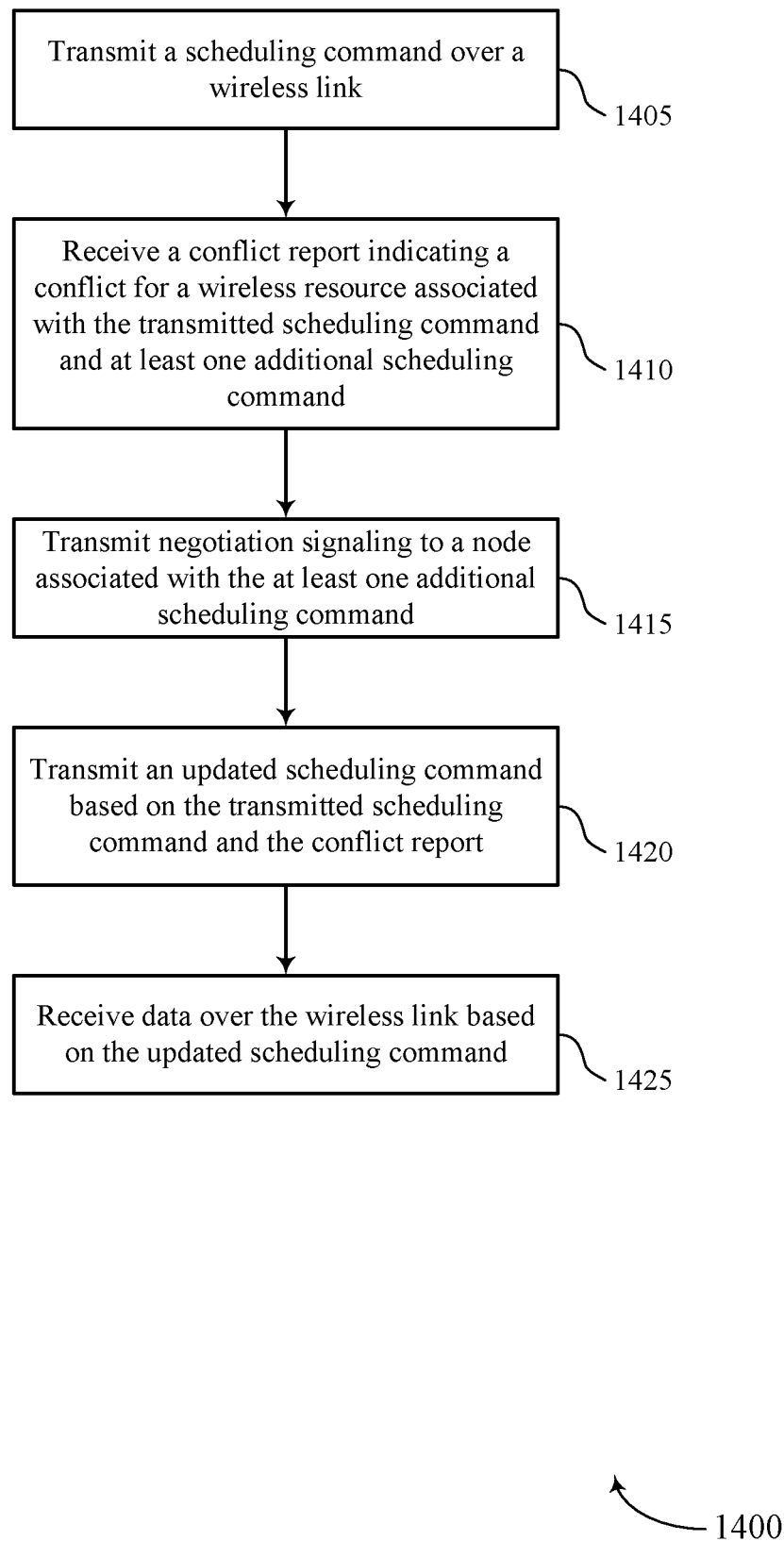

FIG. 14 shows a flowchart illustrating a method 1400 for management of conflicting scheduling commands in wireless networks in accordance with aspects of the present disclosure. The operations of method 1400 may be implemented by a base station 105 or its components as described herein. For example, the operations of method 1400 may be performed by a conflict manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may transmit a scheduling command over a wireless link. The operations of block 1405 may be performed according to the methods described herein. In certain examples, aspects of the operations of block 1405 may be performed by a scheduling command manager as described with reference to FIGS. 5 through 8.

At block 1410 the base station 105 may receive a conflict report indicating a conflict for a wireless resource associated with the transmitted scheduling command and at least one additional scheduling command. The operations of block 1410 may be performed according to the methods described herein. In certain examples, aspects of the operations of block 1410 may be performed by a scheduling conflict manager as described with reference to FIGS. 5 through 8.

At block 1415 the base station 105 may transmit negotiation signaling to a node associated with the at least one additional scheduling command. The operations of block 1415 may be performed according to the methods described herein. In certain examples, aspects of the operations of block 1415 may be performed by a scheduling negotiation manager as described with reference to FIGS. 5 through 8.

At block 1420 the base station 105 may transmit an updated scheduling command based at least in part on the transmitted scheduling command and the conflict report. The operations of block 1420 may be performed according to the methods described herein. In certain examples, aspects of the operations of block 1420 may be performed by a scheduling command manager as described with reference to FIGS. 5 through 8.

At block 1425 the base station 105 may receive data over the wireless link based at least in part on the updated scheduling command. The operations of block 1425 may be performed according to the methods described herein. In certain examples, aspects of the operations of block 1425 may be performed by a receiver as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and backhaul network 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a first base station, a plurality of backhaul scheduling commands for the first base station over a plurality of wireless backhaul links, wherein the plurality of backhaul scheduling commands are from a plurality of second base stations;
   identifying, from the plurality of backhaul scheduling commands, a conflict for a wireless resource;
   selecting a non-conflicting subset of the plurality of backhaul scheduling commands based at least in part on a conflict policy; and
   transmitting data over one or more of the plurality of wireless backhaul links based at least in part on the selected non-conflicting subset.

2. The method of claim 1, further comprising:
   receiving signaling indicating the conflict policy.

3. The method of claim 1, wherein the conflict policy is based at least in part on priority information signaled in one or more of the plurality of backhaul scheduling commands.

4. The method of claim 1, wherein the conflict policy is based at least in part on a size of the selected non-conflicting subset, wherein the size of the selected non-conflicting subset is larger than other non-conflicting subsets of the plurality of backhaul scheduling commands.

5. The method of claim 1, wherein the conflict policy is based at least in part on a priority level associated with one or more of the plurality of wireless backhaul links.

6. The method of claim 1, wherein the conflict policy is based at least in part on a backhaul scheduling command type associated with the plurality of backhaul scheduling commands, wherein the backhaul scheduling command type comprises a scheduling request or a scheduling grant.

7. The method of claim 1, wherein the conflict policy is based at least in part on a non-prioritized scheduling algorithm.

8. The method of claim 1, wherein the conflict policy is based at least in part on a route priority associated with a subset of the plurality of wireless backhaul links, on a buffer size associated with one or more of the plurality of wireless backhaul links, on a degree of isolation between one or more antenna ports associated with the plurality of backhaul scheduling commands, or some combination thereof.

9. The method of claim 1, wherein the wireless resource comprises a time resource, a frequency resource, a code resource, a spatial resource, or a combination thereof.

10. The method of claim 1, wherein the plurality of wireless backhaul links comprise millimeter wave (mmW) wireless backhaul links.

11. The method of claim 1, wherein the plurality of backhaul scheduling commands comprises a scheduling request, a scheduling grant, or both.

12. The method of claim 1, wherein the plurality of backhaul scheduling commands are received over a physical control channel, a media access control (MAC) channel, an upper layer channel, or a combination thereof.

13. The method of claim 1, wherein the plurality of backhaul scheduling commands are received according to a time-synchronized frame structure, a beam-formed antenna pattern, or a combination thereof.

14. The method of claim 1, further comprising:
   receiving the plurality of backhaul scheduling commands within a first time window; and
   transmitting a second plurality of backhaul scheduling commands within a second time window that is non-overlapping with the first time window.

15. The method of claim 1, wherein the plurality of wireless backhaul links comprises fronthaul links, access links, or a combination thereof.

16. A method for wireless communication, comprising:
   receiving, at a first base station, a plurality of backhaul scheduling commands for the first base station over a plurality of wireless backhaul links, wherein the plurality of backhaul scheduling commands are from a plurality of second base stations;
   identifying, from the plurality of backhaul scheduling commands, a conflict for a wireless resource;
   transmitting a conflict report indicating the identified conflict;
   receiving an updated backhaul scheduling command based at least in part on the plurality of backhaul scheduling commands and the conflict report; and
   transmitting data over one or more of the plurality of wireless backhaul links based at least in part on the updated backhaul scheduling command.

17. The method of claim 16, further comprising:
   selecting a node, based at least in part on a selection policy, to which the conflict report is transmitted.

18. The method of claim 17, wherein the selection policy is based at least in part on a priority associated with a wireless backhaul link associated with the node, a type of backhaul scheduling command received from the node, a priority associated with a backhaul scheduling command received from the node, a configured subset of nodes that includes the node, or a combination thereof.

19. The method of claim 17, further comprising:
   receiving signaling indicating the selection policy.

20. The method of claim 16, wherein the conflict report comprises information indicating one or more nodes that transmitted the plurality of backhaul scheduling commands, information indicating the wireless resource associated with the identified conflict, information indicating a direction of data transmission, or a combination thereof.

21. The method of claim 16, wherein the plurality of wireless backhaul links comprises fronthaul links, access links, or a combination thereof.

22. A method for wireless communication, comprising:
transmitting, to a first base station, a backhaul scheduling command for the first base station over a wireless backhaul link;
receiving a conflict report indicating a conflict for a wireless resource associated with the transmitted backhaul scheduling command and at least one additional backhaul scheduling command, wherein the backhaul scheduling command and the at least one additional backhaul scheduling command are from a plurality of second base stations;
transmitting an updated backhaul scheduling command based at least in part on the transmitted backhaul scheduling command and the conflict report; and
receiving data over the wireless backhaul link based at least in part on the updated backhaul scheduling command.

23. The method of claim 22, further comprising:
transmitting negotiation signaling to a node associated with the at least one additional backhaul scheduling command.

24. The method of claim 22, further comprising:
transmitting the backhaul scheduling command based at least in part on a timing delay between transmission of the backhaul scheduling command and data associated with the backhaul scheduling command.

25. The method of claim 22, wherein the wireless backhaul link comprises a fronthaul link, an access link, or a combination thereof.

26. An apparatus for wireless communication, comprising:
a processor;
memory in electronic communication with the processor; and
instructions stored in the memory and operable, when executed by the processor, to cause the apparatus to:
receive, at a first base station, a plurality of backhaul scheduling commands for the first base station over a plurality of wireless backhaul links, wherein the plurality of backhaul scheduling commands are from a plurality of second base stations;
identify, from the plurality of backhaul scheduling commands, a conflict for a wireless resource;
transmit a conflict report indicating the identified conflict;
receive an updated backhaul scheduling command based at least in part on the plurality of backhaul scheduling commands and the conflict report; and
transmit data over one or more of the plurality of wireless backhaul links based at least in part on the updated backhaul scheduling command.

27. The apparatus of claim 26, wherein the instructions are further executable by the processor to:
select a node, based at least in part on a selection policy, to which the conflict report is transmitted.

28. The apparatus of claim 27, wherein the selection policy is based at least in part on a priority associated with a wireless backhaul link associated with the node, a type of backhaul scheduling command received from the node, a priority associated with a backhaul scheduling command received from the node, a configured subset of nodes that includes the node, or a combination thereof.

29. The apparatus of claim 27, wherein the instructions are further executable by the processor to:
receive signaling indicating the selection policy.

30. The apparatus of claim 26, wherein the conflict report comprises information indicating one or more nodes that transmitted the plurality of backhaul scheduling commands, information indicating the wireless resource associated with the identified conflict, information indicating a direction of data transmission, or a combination thereof.

* * * * *